United States Patent
Anin et al.

(10) Patent No.: US 12,531,159 B2
(45) Date of Patent: Jan. 20, 2026

(54) POST-PCI CORONARY ANALYSIS

(71) Applicant: Cathworks Ltd., Kfar Saba (IL)

(72) Inventors: Vered Anin, Tel Aviv (IL); Hila Meirovitch, Kfar Saba (IL); Moran Shalhon Livne, Rosh Ha'ayin (IL); Tal Litvak, Hod Hasharon (IL); Tal Babich, Tel Aviv (IL)

(73) Assignee: Cathworks Ltd., Kfar Saba (IL)

( * ) Notice: Subject to any disclaimer, the term of this patent is extended or adjusted under 35 U.S.C. 154(b) by 0 days.

(21) Appl. No.: 18/821,875

(22) Filed: Aug. 30, 2024

(65) Prior Publication Data

US 2025/0054628 A1 Feb. 13, 2025

Related U.S. Application Data

(63) Continuation of application No. PCT/IB2024/057717, filed on Aug. 9, 2024.
(Continued)

(51) Int. Cl.
*G16H 50/20* (2018.01)
*A61B 5/021* (2006.01)
(Continued)

(52) U.S. Cl.
CPC .............. *G16H 50/20* (2018.01); *A61B 5/021* (2013.01); *G06T 17/00* (2013.01); *G06T 19/20* (2013.01);
(Continued)

(58) Field of Classification Search
CPC ........ G16H 50/20; G16H 15/00; A61B 5/021; G06T 17/00; G06T 19/20; G06T 2200/24; G06T 2210/41; G06T 2210/2012
See application file for complete search history.

(56) References Cited

U.S. PATENT DOCUMENTS

| 5,150,292 A | 9/1992 | Hoffmann et al. |
| 5,638,823 A | 6/1997 | Akay et al. |

(Continued)

FOREIGN PATENT DOCUMENTS

| AU | 2010298333 | 1/2012 |
| CN | 104282009 | 1/2015 |

(Continued)

OTHER PUBLICATIONS

Abraham et al., "Alternative routes in road networks", ACM Journal of Experimental Algorithmics, Association of Computing Machinery, vol. 18(1):1.3:2-1.3:17 (2013).
(Continued)

*Primary Examiner* — Sing-Wai Wu
(74) *Attorney, Agent, or Firm* — Knobbe, Martens, Olson & Bear, LLP

(57) ABSTRACT

Systems and methods for post-PCI coronary analysis. An example method includes accessing a plurality of angiographic images depicting at least one vessel of a patient's heart, the angiographic images including two or more post-percutaneous coronary intervention (post-PCI) images and one or more diagnostic images, wherein the post-PCI images depict a PCI location in which a PCI is included to revascularize a lesion, and wherein the diagnostic images depict the lesion; receiving, via a user interface presenting the post-PCI images, user input specifying positions of the PCI location in the post-PCI images; determining an index indicative of vascular function based on the angiographic images, wherein the index is derived based on a three-dimensional model of the portion of the patient's heart, and wherein individual portions of the diagnostic images depicting the lesion are masked during generation of three-dimensional model; and presenting, via the user interface, sum-
(Continued)

mary information associated with PCI, the summary information including at least the determined index.

26 Claims, 8 Drawing Sheets

Related U.S. Application Data

(60) Provisional application No. 63/518,536, filed on Aug. 9, 2023.

(51) Int. Cl.
*G06T 17/00* (2006.01)
*G06T 19/20* (2011.01)
*G16H 15/00* (2018.01)

(52) U.S. Cl.
CPC .......... *G16H 15/00* (2018.01); *G06T 2200/24* (2013.01); *G06T 2210/41* (2013.01); *G06T 2219/2012* (2013.01)

(56) References Cited

U.S. PATENT DOCUMENTS

| | | | |
|---|---|---|---|
| 6,047,080 A | 4/2000 | Chen et al. |
| 6,186,948 B1 | 2/2001 | Kamiyama et al. |
| 6,236,878 B1 | 5/2001 | Taylor et al. |
| 6,501,848 B1 | 12/2002 | Carroll et al. |
| 6,842,638 B1 | 1/2005 | Suri et al. |
| 7,113,623 B2 | 9/2006 | Chen et al. |
| 7,155,046 B2 | 12/2006 | Aben et al. |
| 7,339,585 B2 | 3/2008 | Verstraelen et al. |
| 7,369,691 B2 | 5/2008 | Kondo et al. |
| 7,574,026 B2 | 8/2009 | Rasche et al. |
| 7,657,299 B2 | 2/2010 | Huizenga et al. |
| 7,693,315 B2 | 4/2010 | Krishnan et al. |
| 7,738,626 B2 | 6/2010 | Weese et al. |
| 7,808,503 B2 | 10/2010 | Duluk, Jr. et al. |
| 7,860,283 B2 | 12/2010 | Begelman et al. |
| 7,864,997 B2 | 1/2011 | Aben |
| 7,912,260 B2 | 3/2011 | Breeuwer et al. |
| 7,970,187 B2 | 6/2011 | Puts et al. |
| 7,983,459 B2 | 7/2011 | Begelman et al. |
| 8,073,224 B2 | 12/2011 | Strobel et al. |
| 8,086,000 B2 | 12/2011 | Weijers et al. |
| 8,090,164 B2 | 1/2012 | Bullitt et al. |
| 8,155,411 B2 | 4/2012 | Hof et al. |
| 8,298,147 B2 | 10/2012 | Huennekens et al. |
| 8,311,748 B2 | 11/2012 | Taylor et al. |
| 8,311,750 B2 | 11/2012 | Taylor |
| 8,315,812 B2 | 11/2012 | Taylor |
| 8,321,150 B2 | 11/2012 | Taylor |
| 8,331,314 B2 | 12/2012 | Quiang et al. |
| 8,496,594 B2 | 7/2013 | Taylor et al. |
| 8,523,779 B2 | 9/2013 | Taylor et al. |
| 8,548,778 B1 | 10/2013 | Hart et al. |
| 8,554,490 B2 | 10/2013 | Tang et al. |
| 8,560,968 B1 | 10/2013 | Nair |
| 8,594,950 B2 | 11/2013 | Taylor |
| 8,715,184 B2 | 5/2014 | Lazebnik |
| 8,768,669 B1 | 7/2014 | Hart et al. |
| 8,771,195 B2 | 7/2014 | Kim et al. |
| 8,787,641 B2 | 7/2014 | Hof et al. |
| 8,812,246 B2 | 8/2014 | Taylor |
| 8,824,752 B1 | 9/2014 | Fonte et al. |
| 8,837,860 B1 | 9/2014 | Grady et al. |
| 8,861,820 B2 | 10/2014 | Fonte et al. |
| 8,917,925 B1 | 12/2014 | Grady et al. |
| 8,934,686 B2 | 1/2015 | Ostrovsky-Berman et al. |
| 8,970,578 B2 | 3/2015 | Voros et al. |
| 9,008,405 B2 | 4/2015 | Fonte et al. |
| 9,042,611 B2 | 5/2015 | Blezek et al. |
| 9,042,613 B2 | 5/2015 | Spilker et al. |
| 9,070,214 B1 | 6/2015 | Grady et al. |
| 9,078,564 B2 | 7/2015 | Taylor |
| 9,087,147 B1 | 7/2015 | Fonte |
| 9,129,418 B2 | 9/2015 | Schormans et al. |
| 9,138,147 B2 | 9/2015 | Schmitt et al. |
| 9,153,047 B1 | 10/2015 | Grady et al. |
| 9,189,600 B2 | 11/2015 | Spilker et al. |
| 9,256,936 B2 | 2/2016 | Jacobs et al. |
| 9,314,584 B1 | 4/2016 | Riley et al. |
| 9,375,191 B2 | 6/2016 | Verstraelen et al. |
| 9,406,141 B2 | 8/2016 | Kelm et al. |
| 9,430,827 B2 | 8/2016 | Kelm et al. |
| 9,466,117 B2 | 10/2016 | Habets et al. |
| 9,471,999 B2 | 10/2016 | Ishii et al. |
| 9,572,495 B2 | 2/2017 | Schmitt et al. |
| 9,576,360 B2 | 2/2017 | Schormans et al. |
| 9,613,186 B2 | 4/2017 | Fonte |
| 9,615,755 B2 | 4/2017 | Riley et al. |
| 9,633,454 B2 | 4/2017 | Lauritsch et al. |
| 9,646,361 B2 | 5/2017 | Koo et al. |
| 9,706,925 B2 | 7/2017 | Taylor |
| 9,743,835 B2 | 8/2017 | Taylor |
| 9,754,082 B2 | 9/2017 | Taylor et al. |
| 9,786,068 B2 | 10/2017 | Ishii et al. |
| 9,801,689 B2 | 10/2017 | Taylor |
| 9,805,465 B2 | 10/2017 | Kyriakou |
| 9,814,433 B2 | 11/2017 | Benishti et al. |
| 9,858,387 B2 | 1/2018 | Lavi et al. |
| 9,870,634 B2 | 1/2018 | Grady et al. |
| 9,888,896 B2 | 2/2018 | Lauritsch et al. |
| 9,934,566 B2 | 4/2018 | Sun et al. |
| 9,940,736 B2 | 4/2018 | Ishii et al. |
| 9,943,233 B2 | 4/2018 | Lavi et al. |
| 9,965,873 B2 | 5/2018 | Grady et al. |
| 9,968,256 B2 | 5/2018 | Taokowsky et al. |
| 9,977,869 B2 | 5/2018 | Lavi et al. |
| 9,999,361 B2 | 6/2018 | Sharma et al. |
| 10,130,266 B2 | 11/2018 | Itu et al. |
| 10,134,129 B2 | 11/2018 | Itu et al. |
| 10,141,074 B2 | 11/2018 | Lavi et al. |
| 10,143,390 B2 | 12/2018 | Ledoux et al. |
| 10,159,529 B2 | 12/2018 | Taylor |
| 10,176,575 B2 | 1/2019 | Isgum et al. |
| 10,210,956 B2 | 2/2019 | Lavi et al. |
| 10,219,704 B2 | 3/2019 | Lavi et al. |
| 10,229,516 B2 | 3/2019 | Aben et al. |
| 10,235,796 B2 | 3/2019 | Aben et al. |
| 10,245,001 B2 | 4/2019 | Redel et al. |
| 10,342,442 B2 | 7/2019 | Hattangadi et al. |
| 10,354,744 B2 | 7/2019 | Sharma et al. |
| 10,360,674 B2 | 7/2019 | Contini et al. |
| 10,363,018 B2 | 7/2019 | Fukuda et al. |
| 10,373,700 B2 | 8/2019 | Sharma et al. |
| 10,376,165 B2 | 8/2019 | Lavi et al. |
| 10,395,366 B2 | 8/2019 | Isgum et al. |
| 10,395,774 B2 | 8/2019 | Lavi et al. |
| 10,420,610 B2 | 9/2019 | Bai et al. |
| 10,424,063 B2 | 9/2019 | Lavi et al. |
| 10,441,235 B2 | 10/2019 | Lavi et al. |
| 10,441,239 B2 | 10/2019 | Abe |
| 10,456,094 B2 | 10/2019 | Fonte et al. |
| 10,463,336 B2 | 11/2019 | Itu et al. |
| 10,470,730 B2 | 11/2019 | Benishti et al. |
| 10,559,388 B2 | 2/2020 | Lavi et al. |
| 10,580,141 B2 | 3/2020 | Freiman et al. |
| 10,580,526 B2 | 3/2020 | Ma et al. |
| 10,595,807 B2 | 3/2020 | Lavi et al. |
| 10,631,737 B2 | 4/2020 | Lavi et al. |
| 10,636,146 B2 | 4/2020 | Zhong et al. |
| 10,650,522 B2 | 5/2020 | Hoi et al. |
| 10,682,180 B2 | 6/2020 | Taylor |
| 10,699,407 B2 | 6/2020 | Isgum et al. |
| 10,702,339 B2 | 7/2020 | Taylor |
| 10,733,792 B2 | 8/2020 | Aben et al. |
| 10,740,961 B2 | 8/2020 | Reiber et al. |
| 10,748,285 B2 | 8/2020 | Igarashi et al. |
| 10,758,200 B2 | 9/2020 | Passerini et al. |
| 10,776,988 B2 | 9/2020 | Grady et al. |
| 10,803,994 B2 | 10/2020 | Lavi et al. |
| 10,803,995 B2 | 10/2020 | Sharma et al. |

(56) References Cited

U.S. PATENT DOCUMENTS

| | | |
|---|---|---|
| 10,828,109 B2 | 11/2020 | Redel |
| 10,854,329 B2 | 12/2020 | Mohr et al. |
| 10,964,017 B2 | 3/2021 | Pack et al. |
| 10,964,071 B2 | 3/2021 | Grady et al. |
| 11,004,198 B2 | 5/2021 | Isgum et al. |
| 11,017,531 B2 | 5/2021 | Harish et al. |
| 11,031,136 B2 | 6/2021 | Grass et al. |
| 11,051,779 B2 | 7/2021 | Turca et al. |
| 11,055,845 B2 | 7/2021 | Nickisch et al. |
| 11,076,770 B2 | 8/2021 | Lavi et al. |
| 11,081,237 B2 | 8/2021 | Lavi et al. |
| 11,083,377 B2 | 8/2021 | Bouwman et al. |
| 11,083,524 B2 | 8/2021 | Taylor |
| 11,087,884 B2 | 8/2021 | Sankaran et al. |
| 11,090,118 B2 | 8/2021 | Taylor |
| 11,116,575 B2 | 9/2021 | Taylor |
| 11,127,503 B2 | 9/2021 | Rabbat et al. |
| 11,138,733 B2 | 10/2021 | Lavi et al. |
| 11,141,123 B2 | 10/2021 | Homann et al. |
| 11,160,524 B2 | 11/2021 | Lavi et al. |
| 11,179,043 B2 | 11/2021 | Haase et al. |
| 11,185,368 B2 | 11/2021 | Spilker et al. |
| 11,195,278 B2 | 12/2021 | Nickisch et al. |
| 11,202,612 B2 | 12/2021 | Sakaguchi |
| 11,216,944 B2 | 1/2022 | Reiber et al. |
| 11,272,845 B2 | 3/2022 | Cheline et al. |
| 11,278,208 B2 * | 3/2022 | Lavi ............... G06T 7/0012 |
| 11,282,170 B2 | 3/2022 | Gauriau et al. |
| 11,288,811 B2 | 3/2022 | Tu et al. |
| 11,288,813 B2 | 3/2022 | Grady et al. |
| 11,295,864 B2 | 4/2022 | Benishti et al. |
| 11,298,187 B2 | 4/2022 | Taylor |
| 11,304,665 B2 | 4/2022 | Sharma et al. |
| 11,308,621 B2 | 4/2022 | Tu et al. |
| 11,328,824 B2 | 5/2022 | Fonte |
| 11,341,631 B2 | 5/2022 | Song et al. |
| 11,375,904 B2 | 7/2022 | Igarashi |
| 11,382,569 B2 | 7/2022 | Grady et al. |
| 11,389,130 B2 | 7/2022 | Itu et al. |
| 11,398,029 B2 | 7/2022 | Grady et al. |
| 11,406,337 B2 | 8/2022 | Lavi et al. |
| 11,406,339 B2 | 8/2022 | Mistretta et al. |
| 11,409,422 B2 | 8/2022 | Olivan Bescos et al. |
| 11,410,308 B2 | 8/2022 | Gulsun et al. |
| 11,423,532 B2 | 8/2022 | Takahashi et al. |
| 11,424,036 B2 | 8/2022 | Fonte et al. |
| 11,424,038 B2 | 8/2022 | Grady et al. |
| 11,443,428 B2 | 9/2022 | Petersen et al. |
| 11,445,923 B2 | 9/2022 | Tu et al. |
| 11,462,326 B2 | 10/2022 | Wang et al. |
| 11,462,329 B2 | 10/2022 | Rabbat et al. |
| 11,468,567 B2 | 10/2022 | Groth et al. |
| 11,481,901 B2 | 10/2022 | Igarashi et al. |
| 11,482,339 B2 | 10/2022 | Koo et al. |
| 11,490,867 B2 | 11/2022 | Homann et al. |
| 11,494,904 B2 | 11/2022 | Fonte et al. |
| 11,495,357 B2 | 11/2022 | Ma et al. |
| 11,501,485 B2 | 11/2022 | Grady et al. |
| 11,508,460 B2 | 11/2022 | Wang et al. |
| 11,510,587 B2 | 11/2022 | Kristanto et al. |
| 11,521,755 B2 | 12/2022 | Taylor et al. |
| 11,523,744 B2 | 12/2022 | Freiman et al. |
| 11,538,161 B2 | 12/2022 | Wang et al. |
| 11,540,931 B2 | 1/2023 | Grady et al. |
| 11,557,036 B2 | 1/2023 | Liao et al. |
| 11,557,069 B2 | 1/2023 | Senzig et al. |
| 11,559,274 B2 | 1/2023 | Auvray et al. |
| 11,564,746 B2 | 1/2023 | Spilker et al. |
| 11,564,748 B2 | 1/2023 | Thienphrapa et al. |
| 11,574,406 B2 | 2/2023 | Chen et al. |
| 11,576,621 B2 | 2/2023 | Sharma et al. |
| 11,576,626 B2 | 2/2023 | Fonte et al. |
| 11,576,637 B2 | 2/2023 | Schmitt et al. |
| 11,576,639 B2 | 2/2023 | Song et al. |
| 11,583,340 B2 | 2/2023 | Taylor |
| 11,589,924 B2 | 2/2023 | Passerini et al. |
| 11,599,996 B2 | 3/2023 | Isgum et al. |
| 11,607,189 B2 | 3/2023 | Tu et al. |
| 11,610,309 B2 | 3/2023 | Kweon et al. |
| 11,610,318 B2 | 3/2023 | Grady et al. |
| 11,615,529 B2 | 3/2023 | Chitiboi |
| 11,615,894 B2 | 3/2023 | Lavi et al. |
| 11,617,620 B2 | 4/2023 | Tran et al. |
| 11,633,118 B2 | 4/2023 | Freiman et al. |
| 11,638,609 B2 | 5/2023 | Sankaran et al. |
| 11,642,171 B2 | 5/2023 | Jaquet et al. |
| 11,653,833 B2 | 5/2023 | Sanders et al. |
| 11,664,128 B2 | 5/2023 | Haase et al. |
| 11,666,236 B2 | 6/2023 | Lavi et al. |
| 11,672,434 B2 | 6/2023 | Tochterman et al. |
| 11,678,853 B2 | 6/2023 | Gulsun et al. |
| 11,678,937 B2 | 6/2023 | Choi et al. |
| 11,688,502 B2 | 6/2023 | Anderson et al. |
| 11,690,518 B2 | 7/2023 | Haase et al. |
| 11,694,339 B2 | 7/2023 | Schormans et al. |
| 11,707,196 B2 | 7/2023 | Lavi et al. |
| 11,707,242 B2 | 7/2023 | Van Walsum et al. |
| 11,710,569 B2 | 7/2023 | Grass et al. |
| 11,728,037 B2 | 8/2023 | Lavi et al. |
| 11,741,574 B2 | 8/2023 | Kweon et al. |
| 11,741,602 B2 | 8/2023 | Reiber et al. |
| 11,744,472 B2 | 9/2023 | Zhao et al. |
| 11,744,544 B2 | 9/2023 | Sheehan et al. |
| 11,748,902 B2 | 9/2023 | Bai et al. |
| 11,756,195 B2 | 9/2023 | Kweon et al. |
| 11,769,254 B2 | 9/2023 | Song et al. |
| 11,776,149 B2 | 10/2023 | Wang et al. |
| 11,779,225 B2 | 10/2023 | Adiyoso |
| 11,779,233 B2 | 10/2023 | Huo et al. |
| 11,779,294 B2 | 10/2023 | Liu et al. |
| 11,786,202 B2 | 10/2023 | Yin et al. |
| 11,793,575 B2 | 10/2023 | Taylor |
| 11,803,966 B2 | 10/2023 | Denzinger et al. |
| 11,810,290 B2 | 11/2023 | Flohr et al. |
| 11,810,661 B2 | 11/2023 | Barley et al. |
| 11,816,836 B2 | 11/2023 | Isgum et al. |
| 11,816,837 B2 | 11/2023 | Lavi et al. |
| 11,826,106 B2 | 11/2023 | Hart et al. |
| 11,826,175 B2 | 11/2023 | Itu et al. |
| 11,847,547 B2 | 12/2023 | Wang et al. |
| 11,861,825 B2 | 1/2024 | Van Pelt et al. |
| 11,861,839 B2 | 1/2024 | Weese et al. |
| 11,861,851 B2 | 1/2024 | Figueroa-Alvarez et al. |
| 11,869,142 B2 | 1/2024 | Bai et al. |
| 11,883,225 B2 | 1/2024 | Sankaran et al. |
| 11,896,416 B2 | 2/2024 | Huo et al. |
| 11,901,081 B2 | 2/2024 | Huo et al. |
| 11,918,291 B2 | 3/2024 | Grass et al. |
| 11,931,195 B2 | 3/2024 | Itu et al. |
| 11,937,963 B2 | 3/2024 | Lavi et al. |
| 11,944,387 B2 | 4/2024 | Sankaran et al. |
| 11,948,677 B2 | 4/2024 | Ghose et al. |
| 11,948,695 B2 | 4/2024 | Taylor et al. |
| 11,980,492 B2 | 5/2024 | Venugopal et al. |
| 11,983,473 B2 | 5/2024 | Aben et al. |
| 11,986,280 B2 | 5/2024 | Grady et al. |
| 11,995,834 B2 | 5/2024 | Neumann et al. |
| 12,016,635 B2 | 6/2024 | Taylor |
| 12,023,189 B2 | 7/2024 | Haase et al. |
| 12,027,253 B2 | 7/2024 | Schoebinger et al. |
| 12,029,494 B2 | 7/2024 | Taylor |
| 12,035,976 B2 | 7/2024 | Choi et al. |
| 12,039,729 B2 | 7/2024 | Kweon et al. |
| 12,042,249 B2 | 7/2024 | Haase et al. |
| 12,048,575 B2 | 7/2024 | Vaillant et al. |
| 12,051,192 B2 | 7/2024 | Aben et al. |
| 12,051,202 B2 | 7/2024 | Freiman et al. |
| 12,051,497 B2 | 7/2024 | Grady et al. |
| 12,062,198 B2 | 8/2024 | Liu et al. |
| 12,067,729 B2 | 8/2024 | Thamm et al. |
| 12,079,994 B2 | 9/2024 | Lavi et al. |
| 12,086,981 B2 | 9/2024 | Bai et al. |
| 12,089,977 B2 | 9/2024 | Isgum et al. |
| 12,094,112 B2 | 9/2024 | Gulsun et al. |

(56) References Cited

U.S. PATENT DOCUMENTS

| | | |
|---|---|---|
| 12,094,188 B2 | 9/2024 | Li et al. |
| 12,094,596 B2 | 9/2024 | Wang et al. |
| 12,100,174 B2 | 9/2024 | Vaillant et al. |
| 12,100,502 B2 | 9/2024 | Cimen et al. |
| 12,109,061 B2 | 10/2024 | Itu et al. |
| 12,109,065 B2 | 10/2024 | Sheehan et al. |
| 12,112,471 B2 | 10/2024 | Viti et al. |
| 12,112,483 B2 | 10/2024 | Grady et al. |
| 12,115,014 B2 | 10/2024 | Haase et al. |
| 12,118,724 B2 | 10/2024 | Van Pelt et al. |
| 12,119,117 B2 | 10/2024 | Wang et al. |
| 12,125,217 B2 | 10/2024 | Venugopal et al. |
| 12,125,261 B2 | 10/2024 | Petersen et al. |
| 12,131,525 B2 | 10/2024 | Groth et al. |
| 12,136,209 B2 | 11/2024 | Haase et al. |
| 12,138,026 B2 | 11/2024 | Grady et al. |
| 12,138,027 B2 | 11/2024 | Lavi et al. |
| 12,142,384 B2 | 11/2024 | Rabbat et al. |
| 12,175,631 B2 | 12/2024 | Kweon et al. |
| 12,175,669 B2 | 12/2024 | Wang et al. |
| 12,176,094 B2 | 12/2024 | Taylor et al. |
| 12,178,557 B2 | 12/2024 | Grady et al. |
| 12,186,062 B2 | 1/2025 | Fonte et al. |
| 12,190,503 B2 | 1/2025 | Denzinger et al. |
| 12,190,504 B2 | 1/2025 | Aben et al. |
| 12,193,793 B2 | 1/2025 | Bouwman et al. |
| 12,198,335 B2 | 1/2025 | Haase et al. |
| 12,207,961 B2 | 1/2025 | Liu et al. |
| 12,211,208 B2 | 1/2025 | Bruch-El et al. |
| 12,211,250 B2 | 1/2025 | Kweon et al. |
| 12,217,427 B2 | 2/2025 | Schreckenberg et al. |
| 12,217,872 B2 | 2/2025 | Lavi et al. |
| 12,229,956 B2 | 2/2025 | Kim et al. |
| 12,236,600 B2 | 2/2025 | Lavi et al. |
| 12,268,545 B2 | 4/2025 | Aben |
| 12,283,052 B2 | 4/2025 | Bhowmick et al. |
| 12,299,075 B2 | 5/2025 | Muehlberg et al. |
| 12,307,660 B2 | 5/2025 | Yang et al. |
| 12,307,672 B2 | 5/2025 | Tu et al. |
| 12,315,076 B1 | 5/2025 | Farkash et al. |
| 12,318,238 B2 | 6/2025 | Venugopal et al. |
| 12,327,350 B2 | 6/2025 | Yuan et al. |
| 12,333,723 B2 | 6/2025 | Kim |
| 12,336,763 B2 | 6/2025 | Sankaran et al. |
| 12,343,119 B2 | 7/2025 | Lavi et al. |
| 12,354,755 B2 | 7/2025 | Benishti et al. |
| 12,357,387 B2 | 7/2025 | Taylor |
| 12,361,559 B2 | 7/2025 | Kim et al. |
| 12,362,060 B2 | 7/2025 | Schoebinger et al. |
| 12,364,451 B2 | 7/2025 | He et al. |
| 12,387,325 B2 | 8/2025 | Shalhon Livne et al. |
| 2003/0105401 A1 | 6/2003 | Jago et al. |
| 2004/0019264 A1 | 1/2004 | Suurmond et al. |
| 2004/0066958 A1 | 4/2004 | Chen et al. |
| 2005/0041842 A1 | 2/2005 | Frakes et al. |
| 2005/0043614 A1 | 2/2005 | Huizenga et al. |
| 2005/0209525 A1 | 9/2005 | Bojovic et al. |
| 2005/0249327 A1 | 11/2005 | Wink et al. |
| 2005/0272992 A1 | 12/2005 | O'Donnell et al. |
| 2006/0036167 A1 | 2/2006 | Shina |
| 2006/0074285 A1 | 4/2006 | Zarkh et al. |
| 2006/0084862 A1 | 4/2006 | Suurmond et al. |
| 2006/0098010 A1 | 5/2006 | Dwyer et al. |
| 2007/0031019 A1 | 2/2007 | Lesage et al. |
| 2007/0167833 A1 | 7/2007 | Redel et al. |
| 2007/0232886 A1 | 10/2007 | Camus et al. |
| 2008/0020362 A1 | 1/2008 | Cotin et al. |
| 2008/0187199 A1 | 8/2008 | Gulsun et al. |
| 2008/0205722 A1 | 8/2008 | Schaefer et al. |
| 2009/0016483 A1 | 1/2009 | Kawasaki et al. |
| 2009/0016587 A1 | 1/2009 | Strobel et al. |
| 2009/0171321 A1 | 7/2009 | Callaghan |
| 2009/0276229 A1 | 11/2009 | Grigorov et al. |
| 2009/0299640 A1 | 12/2009 | Ellis et al. |
| 2009/0312648 A1 | 12/2009 | Zhang et al. |
| 2010/0010428 A1 | 1/2010 | Yu et al. |
| 2010/0017171 A1 | 1/2010 | Spilker et al. |
| 2010/0021025 A1 | 1/2010 | Hof et al. |
| 2010/0067760 A1 | 3/2010 | Zhang et al. |
| 2010/0125197 A1 | 5/2010 | Fishel |
| 2010/0160764 A1 | 6/2010 | Steinberg et al. |
| 2010/0160773 A1 | 6/2010 | Cohen et al. |
| 2010/0161023 A1 | 6/2010 | Cohen et al. |
| 2010/0217144 A1 | 8/2010 | Brian |
| 2010/0220917 A1 | 9/2010 | Steinberg et al. |
| 2010/0239140 A1 | 9/2010 | Ruijters et al. |
| 2010/0296709 A1 | 11/2010 | Ostrovsky-Berman et al. |
| 2010/0298719 A1 | 11/2010 | Thrysoe et al. |
| 2011/0015530 A1 | 1/2011 | Misawa |
| 2011/0091377 A1 | 4/2011 | Alani et al. |
| 2011/0096907 A1 | 4/2011 | Mohamed |
| 2011/0134433 A1 | 6/2011 | Yamada |
| 2011/0135175 A1 | 6/2011 | Ostrovsky-Berman et al. |
| 2011/0142313 A1 | 6/2011 | Pack et al. |
| 2011/0182492 A1 | 7/2011 | Grass et al. |
| 2012/0014574 A1 | 1/2012 | Ferschel et al. |
| 2012/0041318 A1 | 2/2012 | Taylor |
| 2012/0041739 A1 | 2/2012 | Taylor |
| 2012/0053918 A1 | 3/2012 | Taylor |
| 2012/0053919 A1 | 3/2012 | Taylor |
| 2012/0053921 A1 | 3/2012 | Taylor |
| 2012/0059246 A1 | 3/2012 | Taylor |
| 2012/0059249 A1 | 3/2012 | Verard et al. |
| 2012/0062841 A1 | 3/2012 | Stetson et al. |
| 2012/0072190 A1 | 3/2012 | Sharma et al. |
| 2012/0075284 A1 | 3/2012 | Rivers et al. |
| 2012/0150048 A1 | 6/2012 | Kang et al. |
| 2012/0177275 A1 | 7/2012 | Suri |
| 2012/0230565 A1 | 9/2012 | Steinberg et al. |
| 2012/0236032 A1 | 9/2012 | Arvidsson |
| 2012/0243761 A1 | 9/2012 | Senzig et al. |
| 2013/0028490 A1 | 1/2013 | Kim et al. |
| 2013/0054214 A1 | 2/2013 | Taylor |
| 2013/0060133 A1 | 3/2013 | Kassab et al. |
| 2013/0094745 A1 | 4/2013 | Sundar |
| 2013/0158476 A1 | 6/2013 | Olson |
| 2013/0182936 A1 | 7/2013 | Yoshihara et al. |
| 2013/0202170 A1 | 8/2013 | Blezek et al. |
| 2013/0226003 A1 | 8/2013 | Edic et al. |
| 2013/0229621 A1 | 9/2013 | Stetson et al. |
| 2013/0324842 A1 | 12/2013 | Mittal et al. |
| 2014/0005535 A1 | 1/2014 | Edic et al. |
| 2014/0046642 A1 | 2/2014 | Hart et al. |
| 2014/0086461 A1 | 3/2014 | Yao et al. |
| 2014/0094693 A1 | 4/2014 | Cohen et al. |
| 2014/0094697 A1 | 4/2014 | Petroff et al. |
| 2014/0100451 A1 | 4/2014 | Tolkowsky et al. |
| 2014/0121513 A1 | 5/2014 | Tolkowsky et al. |
| 2014/0142398 A1 | 5/2014 | Patil et al. |
| 2014/0180035 A1 | 6/2014 | Anderson |
| 2014/0187920 A1 | 7/2014 | Millett et al. |
| 2014/0200867 A1 | 7/2014 | Lavi et al. |
| 2014/0249790 A1 | 9/2014 | Spilker et al. |
| 2014/0270442 A1 | 9/2014 | Jung |
| 2014/0303495 A1 | 10/2014 | Fonte et al. |
| 2014/0371578 A1 | 12/2014 | Auvray et al. |
| 2015/0092999 A1 | 4/2015 | Schmitt et al. |
| 2015/0201897 A1 | 7/2015 | Kyriakou |
| 2015/0213600 A1 | 7/2015 | Kyriakou |
| 2015/0250395 A1 | 9/2015 | Igarashi |
| 2015/0265162 A1 | 9/2015 | Lavi et al. |
| 2015/0265222 A1 | 9/2015 | Sakaguchi |
| 2015/0297373 A1 | 10/2015 | Schmitt et al. |
| 2015/0302578 A1 | 10/2015 | Grady et al. |
| 2015/0335304 A1 | 11/2015 | Lavi et al. |
| 2015/0339847 A1 | 11/2015 | Benishti et al. |
| 2015/0342551 A1 | 12/2015 | Lavi et al. |
| 2015/0374243 A1* | 12/2015 | Itu ................. A61B 5/7275 703/2 |
| 2016/0007945 A1 | 1/2016 | Taylor |
| 2016/0015349 A1 | 1/2016 | Ohuchi et al. |
| 2016/0022371 A1 | 1/2016 | Sauer et al. |
| 2016/0035088 A1 | 2/2016 | Abramoff et al. |
| 2016/0035103 A1 | 2/2016 | Stawiaski et al. |

(56) References Cited

U.S. PATENT DOCUMENTS

| | | |
|---|---|---|
| 2016/0073928 A1 | 3/2016 | Soper et al. |
| 2016/0110866 A1 | 4/2016 | Taylor |
| 2016/0110867 A1 | 4/2016 | Taylor |
| 2016/0128661 A1 | 5/2016 | Taylor |
| 2016/0157802 A1 | 6/2016 | Anderson |
| 2016/0228000 A1 | 8/2016 | Spaide |
| 2016/0247279 A1 | 8/2016 | Lavi et al. |
| 2016/0371456 A1 | 12/2016 | Taylor et al. |
| 2017/0018116 A1 | 1/2017 | Sun et al. |
| 2017/0039736 A1 | 2/2017 | Aben et al. |
| 2017/0161897 A1 | 6/2017 | Hoffmann et al. |
| 2017/0224418 A1 | 8/2017 | Boettner et al. |
| 2017/0238904 A1 | 8/2017 | Perrey et al. |
| 2017/0258433 A1 | 9/2017 | Gulsun et al. |
| 2017/0286628 A1 | 10/2017 | Shim |
| 2017/0325770 A1 | 11/2017 | Edic et al. |
| 2018/0032653 A1 | 2/2018 | Aben et al. |
| 2018/0033192 A1 | 2/2018 | deVaan et al. |
| 2018/0075221 A1 | 3/2018 | Vergaro et al. |
| 2018/0089829 A1 | 3/2018 | Zhong et al. |
| 2018/0102189 A1 | 4/2018 | Hosoi et al. |
| 2018/0182096 A1 | 6/2018 | Grady et al. |
| 2018/0211386 A1 | 7/2018 | Ma et al. |
| 2018/0235561 A1 | 8/2018 | Lavi et al. |
| 2018/0243033 A1 | 8/2018 | Tran et al. |
| 2018/0268941 A1 | 9/2018 | Lavi et al. |
| 2018/0271614 A1* | 9/2018 | Kunio ............... A61B 90/37 |
| 2018/0280088 A1* | 10/2018 | Davies ............... A61B 34/10 |
| 2018/0315193 A1 | 11/2018 | Paschalakis et al. |
| 2018/0330507 A1 | 11/2018 | Schormans et al. |
| 2018/0344173 A1 | 12/2018 | Tu et al. |
| 2018/0344174 A9 | 12/2018 | Schmitt et al. |
| 2019/0005737 A1 | 1/2019 | Auvray et al. |
| 2019/0019347 A1 | 1/2019 | Auvray et al. |
| 2019/0038356 A1 | 2/2019 | Schmitt et al. |
| 2019/0130578 A1 | 5/2019 | Gulsun et al. |
| 2019/0156159 A1 | 5/2019 | Kopparapu |
| 2019/0172205 A1 | 6/2019 | Mao et al. |
| 2019/0180880 A1 | 6/2019 | Lavi et al. |
| 2019/0282199 A1 | 9/2019 | Merritt |
| 2019/0362494 A1 | 11/2019 | Wang et al. |
| 2019/0380593 A1 | 12/2019 | Bouwman et al. |
| 2020/0126229 A1 | 4/2020 | Lavi et al. |
| 2020/0138521 A1 | 5/2020 | Aben et al. |
| 2020/0143526 A1 | 5/2020 | Wang et al. |
| 2020/0160509 A1 | 5/2020 | Pack et al. |
| 2020/0222018 A1 | 7/2020 | van Walsum et al. |
| 2020/0226422 A1 | 7/2020 | Li et al. |
| 2020/0265958 A1 | 8/2020 | Haase et al. |
| 2020/0337664 A1 | 10/2020 | Homann et al. |
| 2020/0349708 A1 | 11/2020 | Igarashi et al. |
| 2020/0380493 A1 | 12/2020 | Morales et al. |
| 2020/0388363 A1 | 12/2020 | Docktor et al. |
| 2020/0394795 A1 | 12/2020 | Isgum et al. |
| 2021/0022617 A1 | 1/2021 | Zhao et al. |
| 2021/0035290 A1 | 2/2021 | Aben et al. |
| 2021/0042927 A1* | 2/2021 | Amis ............... G16H 30/40 |
| 2021/0085397 A1* | 3/2021 | Passerini ............ A61B 5/7278 |
| 2021/0209757 A1 | 7/2021 | Min et al. |
| 2021/0244293 A1 | 8/2021 | Belleville |
| 2021/0244299 A1 | 8/2021 | Tochterman et al. |
| 2021/0244475 A1 | 8/2021 | Taylor |
| 2021/0259559 A1 | 8/2021 | Tu et al. |
| 2021/0267690 A1 | 9/2021 | Taylor |
| 2021/0272030 A1 | 9/2021 | Sankaran et al. |
| 2021/0275124 A1 | 9/2021 | Huo et al. |
| 2021/0280318 A1 | 9/2021 | Huo et al. |
| 2021/0282731 A1 | 9/2021 | Vaillant et al. |
| 2021/0282860 A1 | 9/2021 | Taylor |
| 2021/0290308 A1 | 9/2021 | Mihalef et al. |
| 2021/0298706 A1 | 9/2021 | Tu et al. |
| 2021/0298708 A1 | 9/2021 | Aben et al. |
| 2021/0334963 A1 | 10/2021 | Isgum et al. |
| 2021/0338088 A1 | 11/2021 | Bouwman et al. |
| 2021/0345889 A1 | 11/2021 | Tu et al. |
| 2021/0358634 A1 | 11/2021 | Sankaran et al. |
| 2021/0361176 A1 | 11/2021 | Huo et al. |
| 2021/0374950 A1 | 12/2021 | Gao et al. |
| 2021/0383539 A1 | 12/2021 | Haase et al. |
| 2021/0401400 A1 | 12/2021 | Sheehan et al. |
| 2022/0012876 A1 | 1/2022 | Sommer et al. |
| 2022/0012878 A1 | 1/2022 | Aoyama |
| 2022/0015730 A1 | 1/2022 | Haase et al. |
| 2022/0036646 A1 | 2/2022 | Song et al. |
| 2022/0039769 A1 | 2/2022 | M et al. |
| 2022/0054022 A1 | 2/2022 | Van Lavieren |
| 2022/0079455 A1 | 3/2022 | Haase et al. |
| 2022/0079540 A1 | 3/2022 | Sankaran et al. |
| 2022/0079563 A1 | 3/2022 | Kemp |
| 2022/0087544 A1 | 3/2022 | Schmitt et al. |
| 2022/0092775 A1 | 3/2022 | Denzinger et al. |
| 2022/0092784 A1 | 3/2022 | Tu et al. |
| 2022/0101535 A1 | 3/2022 | Thamm et al. |
| 2022/0110687 A1 | 4/2022 | Spilker et al. |
| 2022/0125398 A1 | 4/2022 | Aben |
| 2022/0151580 A1 | 5/2022 | Itu et al. |
| 2022/0156918 A1 | 5/2022 | Chitiboi et al. |
| 2022/0164950 A1 | 5/2022 | Aben et al. |
| 2022/0164953 A1 | 5/2022 | Gulsun et al. |
| 2022/0167938 A1 | 6/2022 | Grass et al. |
| 2022/0172368 A1 | 6/2022 | Lavi et al. |
| 2022/0175260 A1 | 6/2022 | Sonck et al. |
| 2022/0183655 A1 | 6/2022 | Huang et al. |
| 2022/0211280 A1 | 7/2022 | Lavi et al. |
| 2022/0211439 A1 | 7/2022 | Sankaran et al. |
| 2022/0215534 A1 | 7/2022 | Bai et al. |
| 2022/0230312 A1 | 7/2022 | Choi et al. |
| 2022/0233081 A1 | 7/2022 | Cheline et al. |
| 2022/0254028 A1 | 8/2022 | Liu et al. |
| 2022/0254131 A1 | 8/2022 | Lavi et al. |
| 2022/0261997 A1 | 8/2022 | Liu et al. |
| 2022/0262000 A1 | 8/2022 | Haase et al. |
| 2022/0273180 A1 | 9/2022 | Lavi et al. |
| 2022/0277447 A1 | 9/2022 | Wang et al. |
| 2022/0287668 A1 | 9/2022 | Gulsun et al. |
| 2022/0301156 A1 | 9/2022 | Fang et al. |
| 2022/0310265 A1 | 9/2022 | Benishti et al. |
| 2022/0319004 A1 | 10/2022 | Bruch-El et al. |
| 2022/0319116 A1 | 10/2022 | Wang et al. |
| 2022/0335612 A1 | 10/2022 | Bruch-El et al. |
| 2022/0344033 A1 | 10/2022 | Wang et al. |
| 2022/0351369 A1 | 11/2022 | Haase et al. |
| 2022/0359063 A1 | 11/2022 | Tombropoulos et al. |
| 2022/0374807 A1 | 11/2022 | Mahmood |
| 2022/0378383 A1 | 12/2022 | Chen et al. |
| 2022/0392076 A1 | 12/2022 | Seo et al. |
| 2022/0392616 A1 | 12/2022 | Ghose et al. |
| 2022/0415510 A1 | 12/2022 | Wang et al. |
| 2023/0005113 A1 | 1/2023 | Li et al. |
| 2023/0028300 A1 | 1/2023 | Lichy et al. |
| 2023/0037338 A1 | 2/2023 | Wang et al. |
| 2023/0038364 A1 | 2/2023 | Bhowmick et al. |
| 2023/0052595 A1 | 2/2023 | Langoju et al. |
| 2023/0071558 A1 | 3/2023 | Vaidya et al. |
| 2023/0084748 A1 | 3/2023 | Lavi et al. |
| 2023/0086196 A1 | 3/2023 | Chitiboi et al. |
| 2023/0091099 A1 | 3/2023 | Wang et al. |
| 2023/0095242 A1 | 3/2023 | Liu et al. |
| 2023/0097133 A1 | 3/2023 | Bai et al. |
| 2023/0097267 A1 | 3/2023 | Schwemmer et al. |
| 2023/0102646 A1 | 3/2023 | Birkhold et al. |
| 2023/0108647 A1 | 4/2023 | Tu et al. |
| 2023/0113721 A1 | 4/2023 | Kassel et al. |
| 2023/0117179 A1 | 4/2023 | Jule et al. |
| 2023/0142152 A1 | 5/2023 | Venugopal et al. |
| 2023/0142219 A1 | 5/2023 | Makino |
| 2023/0144624 A1 | 5/2023 | Venugopal et al. |
| 2023/0144795 A1 | 5/2023 | Wang et al. |
| 2023/0148977 A1 | 5/2023 | Fonte et al. |
| 2023/0177677 A1 | 6/2023 | Yuan et al. |
| 2023/0186472 A1 | 6/2023 | Kweon et al. |
| 2023/0196582 A1 | 6/2023 | Grady et al. |
| 2023/0197286 A1 | 6/2023 | Grady et al. |
| 2023/0230235 A1 | 7/2023 | Isgum et al. |

(56) References Cited

U.S. PATENT DOCUMENTS

| | | |
|---|---|---|
| 2023/0237648 A1 | 7/2023 | Gulsun et al. |
| 2023/0237652 A1 | 7/2023 | Flexman et al. |
| 2023/0245301 A1 | 8/2023 | Wang et al. |
| 2023/0252628 A1 | 8/2023 | Haase et al. |
| 2023/0252632 A1 | 8/2023 | Shalhon Livne et al. |
| 2023/0260107 A1 | 8/2023 | Dhatt et al. |
| 2023/0263401 A1 | 8/2023 | Escaned-Barbosa et al. |
| 2023/0277247 A1 | 9/2023 | Taylor et al. |
| 2023/0282365 A1 | 9/2023 | Lavi et al. |
| 2023/0298176 A1 | 9/2023 | Choi et al. |
| 2023/0298180 A1 | 9/2023 | Kweon et al. |
| 2023/0307144 A1 | 9/2023 | He et al. |
| 2023/0309943 A1 | 10/2023 | van Walsum et al. |
| 2023/0320789 A1 | 10/2023 | Bai et al. |
| 2023/0326127 A1 | 10/2023 | Zhong et al. |
| 2023/0334659 A1 | 10/2023 | Kuo et al. |
| 2023/0346236 A1 | 11/2023 | Lavi et al. |
| 2023/0352152 A1 | 11/2023 | Grady et al. |
| 2023/0355107 A1 | 11/2023 | Haase et al. |
| 2023/0355196 A1 | 11/2023 | Kang et al. |
| 2023/0355197 A1 | 11/2023 | Florent et al. |
| 2023/0360803 A1 | 11/2023 | Sankaran et al. |
| 2023/0368378 A1 | 11/2023 | Kim et al. |
| 2023/0368878 A1 | 11/2023 | Molenda |
| 2023/0386037 A1 | 11/2023 | Denzinger et al. |
| 2023/0394654 A1 | 12/2023 | Hampe et al. |
| 2023/0404525 A1 | 12/2023 | Sheehan et al. |
| 2023/0410307 A1 | 12/2023 | Nickisch et al. |
| 2024/0029529 A1 | 1/2024 | Scalisi |
| 2024/0029868 A1 | 1/2024 | Gulsun et al. |
| 2024/0046465 A1 | 2/2024 | Sharma et al. |
| 2024/0047043 A1 | 2/2024 | Flexman et al. |
| 2024/0050159 A1 | 2/2024 | Hart et al. |
| 2024/0065772 A1 | 2/2024 | Levi et al. |
| 2024/0078676 A1 | 3/2024 | Van Pelt et al. |
| 2024/0096479 A1 | 3/2024 | Kraus et al. |
| 2024/0099589 A1 | 3/2024 | Lavi et al. |
| 2024/0099683 A1 | 3/2024 | Cimen et al. |
| 2024/0104719 A1 | 3/2024 | Gulsun et al. |
| 2024/0126958 A1 | 4/2024 | Aben et al. |
| 2024/0130674 A1* | 4/2024 | Sonck .................... A61B 5/021 |
| 2024/0130796 A1 | 4/2024 | Song et al. |
| 2024/0153087 A1 | 5/2024 | Lavi et al. |
| 2024/0164865 A1 | 5/2024 | Kottenstette et al. |
| 2024/0169540 A1 | 5/2024 | Bouwman et al. |
| 2024/0185485 A1 | 6/2024 | Salomon et al. |
| 2024/0185509 A1 | 6/2024 | Kovler et al. |
| 2024/0206838 A1 | 6/2024 | Lavi et al. |
| 2024/0212159 A1 | 6/2024 | Katzmann et al. |
| 2024/0215937 A1 | 7/2024 | Itu et al. |
| 2024/0221355 A1 | 7/2024 | Kweon et al. |
| 2024/0260919 A1 | 8/2024 | Venugopal et al. |
| 2024/0273723 A1 | 8/2024 | Tison et al. |
| 2024/0315777 A1 | 9/2024 | Choi et al. |
| 2024/0324870 A1 | 10/2024 | Wong et al. |
| 2024/0346644 A1 | 10/2024 | Venugopal |
| 2024/0346648 A1 | 10/2024 | Kim et al. |
| 2024/0366409 A1 | 11/2024 | Xiang et al. |
| 2024/0374148 A1 | 11/2024 | Haase et al. |
| 2024/0386547 A1 | 11/2024 | Nadakuditi et al. |
| 2024/0386652 A1 | 11/2024 | Grady et al. |
| 2024/0387045 A1 | 11/2024 | Lynch et al. |
| 2024/0394875 A1 | 11/2024 | Van Der Horst et al. |
| 2024/0394996 A1 | 11/2024 | Hitschrich et al. |
| 2024/0404031 A1 | 12/2024 | Auvray et al. |
| 2024/0404057 A1 | 12/2024 | Florent et al. |
| 2024/0404232 A1 | 12/2024 | Rockwell et al. |
| 2024/0407656 A1 | 12/2024 | This et al. |
| 2024/0412365 A1 | 12/2024 | Kim |
| 2024/0420331 A1 | 12/2024 | Kim et al. |
| 2024/0423575 A1 | 12/2024 | Itu et al. |
| 2024/0428477 A1 | 12/2024 | Salehi et al. |
| 2025/0022133 A1 | 1/2025 | Wissel et al. |
| 2025/0032079 A1 | 1/2025 | Gomez et al. |
| 2025/0069347 A1 | 2/2025 | Lavi et al. |
| 2025/0072971 A1 | 3/2025 | Jeong et al. |
| 2025/0072972 A1 | 3/2025 | Won et al. |
| 2025/0078261 A1 | 3/2025 | DePaoli et al. |
| 2025/0078268 A1 | 3/2025 | Kim et al. |
| 2025/0078288 A1 | 3/2025 | Pedrizzetti et al. |
| 2025/0082218 A1 | 3/2025 | Fonte et al. |
| 2025/0086794 A1 | 3/2025 | Aben et al. |
| 2025/0090032 A1 | 3/2025 | Bouwman et al. |
| 2025/0090034 A1 | 3/2025 | Grady et al. |
| 2025/0099060 A1 | 3/2025 | Turcea et al. |
| 2025/0104228 A1 | 3/2025 | Neumann et al. |
| 2025/0117941 A1 | 4/2025 | Bruch-El et al. |
| 2025/0124578 A1 | 4/2025 | Kim et al. |
| 2025/0127473 A1 | 4/2025 | Ku |
| 2025/0131567 A1 | 4/2025 | Kitslaar et al. |
| 2025/0131568 A1 | 4/2025 | Lavi et al. |
| 2025/0138709 A1 | 5/2025 | Boucneau et al. |
| 2025/0139779 A1 | 5/2025 | Won et al. |
| 2025/0157032 A1 | 5/2025 | Kim et al. |
| 2025/0166177 A1 | 5/2025 | Kwon et al. |
| 2025/0166196 A1 | 5/2025 | Lavi et al. |
| 2025/0166843 A1 | 5/2025 | Lavi et al. |
| 2025/0169703 A1 | 5/2025 | Tu et al. |
| 2025/0169784 A1 | 5/2025 | Ahn et al. |
| 2025/0174005 A1 | 5/2025 | Kweon et al. |
| 2025/0186012 A1 | 6/2025 | Kim et al. |
| 2025/0204801 A1 | 6/2025 | Wissel et al. |
| 2025/0217979 A1 | 7/2025 | Kim et al. |
| 2025/0217985 A1 | 7/2025 | Bruch el et al. |
| 2025/0241551 A1 | 7/2025 | Lavi et al. |

FOREIGN PATENT DOCUMENTS

| | | |
|---|---|---|
| CN | 113837985 | 12/2021 |
| CN | 113935976 | 1/2022 |
| EP | 1396274 | 3/2004 |
| EP | 2163272 | 3/2010 |
| EP | 2633815 A1 | 9/2013 |
| EP | 2779907 | 9/2014 |
| EP | 2873371 | 5/2015 |
| EP | 3125764 | 2/2017 |
| EP | 2633815 B1 | 6/2017 |
| EP | 3363350 | 8/2018 |
| EP | 2977922 | 3/2019 |
| EP | 3460688 | 3/2019 |
| EP | 3477551 | 5/2019 |
| EP | 3763285 | 1/2021 |
| EP | 3847956 | 7/2021 |
| EP | 2776960 | 9/2021 |
| EP | 3534372 | 9/2021 |
| EP | 3871184 | 9/2021 |
| EP | 3881758 | 9/2021 |
| EP | 3884868 | 9/2021 |
| EP | 3282380 | 11/2021 |
| EP | 3282381 | 11/2021 |
| EP | 3903672 | 11/2021 |
| EP | 3912139 | 11/2021 |
| EP | 3664026 | 2/2022 |
| EP | 3945469 | 2/2022 |
| EP | 3949860 | 2/2022 |
| EP | 3951705 | 2/2022 |
| EP | 3076854 | 4/2022 |
| EP | 3979259 | 4/2022 |
| EP | 3982324 | 4/2022 |
| EP | 3258446 | 5/2022 |
| EP | 4002288 | 5/2022 |
| EP | 4026143 | 7/2022 |
| EP | 4026491 | 7/2022 |
| EP | 4026492 | 7/2022 |
| EP | 4029438 | 7/2022 |
| EP | 3298959 | 9/2022 |
| EP | 3989828 | 11/2022 |
| EP | 3157411 | 12/2022 |
| EP | 3606437 | 12/2022 |
| EP | 4104765 | 12/2022 |
| EP | 4113434 | 1/2023 |
| EP | 4131150 | 2/2023 |
| EP | 4137053 | 2/2023 |
| EP | 4145391 | 3/2023 |

(56) References Cited

FOREIGN PATENT DOCUMENTS

| | | |
|---|---|---|
| EP | 4156112 | 3/2023 |
| EP | 3169237 | 4/2023 |
| EP | 4160528 | 4/2023 |
| EP | 4160543 | 4/2023 |
| EP | 4170579 | 4/2023 |
| EP | 4186417 | 5/2023 |
| EP | 3403582 | 6/2023 |
| EP | 3743883 | 6/2023 |
| EP | 3989832 | 8/2023 |
| EP | 4220553 | 8/2023 |
| EP | 4224416 | 8/2023 |
| EP | 3652747 | 9/2023 |
| EP | 4104766 | 9/2023 |
| EP | 4238500 | 9/2023 |
| EP | 3602485 | 10/2023 |
| EP | 4064181 | 11/2023 |
| EP | 3602487 | 12/2023 |
| EP | 4300419 | 1/2024 |
| EP | 4312184 | 1/2024 |
| EP | 3404667 | 2/2024 |
| EP | 3878366 | 4/2024 |
| EP | 3457413 | 5/2024 |
| EP | 4005472 | 5/2024 |
| EP | 4369290 | 5/2024 |
| EP | 4176814 | 7/2024 |
| EP | 4413927 | 8/2024 |
| EP | 4418206 | 8/2024 |
| EP | 3846176 | 9/2024 |
| EP | 3881758 B1 | 9/2024 |
| EP | 3564963 | 10/2024 |
| EP | 4056110 | 10/2024 |
| EP | 4439476 | 10/2024 |
| EP | 4548838 | 5/2025 |
| EP | 4555935 | 5/2025 |
| EP | 3818927 | 6/2025 |
| EP | 3828815 | 6/2025 |
| JP | H07-271976 | 10/1995 |
| JP | H08-131429 | 5/1996 |
| JP | 2003-508152 | 3/2003 |
| JP | 2003-514600 | 4/2003 |
| JP | 2004-243117 | 9/2004 |
| JP | 2007-502644 | 2/2007 |
| JP | 2007-325920 | 12/2007 |
| JP | 4177217 B2 | 11/2008 |
| JP | 2010-042247 | 2/2010 |
| JP | 2011-212314 | 10/2011 |
| JP | 2012-043498 | 3/2012 |
| JP | 2013-090799 | 5/2013 |
| JP | 2010-505493 | 7/2013 |
| JP | 2013-534154 | 9/2013 |
| JP | 2014-064915 | 4/2014 |
| JP | 2014-128631 | 7/2014 |
| JP | 2014-198241 | 10/2014 |
| JP | 2015-527901 | 9/2015 |
| JP | 2017-516535 | 6/2017 |
| JP | 2018-057835 | 4/2018 |
| JP | 2018-089364 | 6/2018 |
| NL | 2012324 | 8/2015 |
| WO | WO 2001/21057 | 3/2001 |
| WO | WO 2007/066249 | 6/2007 |
| WO | WO 2010/033971 | 3/2010 |
| WO | WO 2011/038044 | 3/2011 |
| WO | WO 2011/039685 | 4/2011 |
| WO | WO 2012/021037 | 2/2012 |
| WO | WO 2012/021307 | 2/2012 |
| WO | WO 2012/043498 | 4/2012 |
| WO | WO 2012/173697 | 12/2012 |
| WO | WO 2013/102880 | 7/2013 |
| WO | WO 2014/027692 | 2/2014 |
| WO | WO 2014/064702 | 5/2014 |
| WO | WO 2014/111927 | 7/2014 |
| WO | WO 2014/111929 | 7/2014 |
| WO | WO 2014/111930 | 7/2014 |
| WO | WO 2015/017420 | 2/2015 |
| WO | WO 2015/059706 | 4/2015 |
| WO | WO 2016/135330 | 9/2016 |
| WO | WO 2016/161356 | 10/2016 |
| WO | WO 2017/056007 | 4/2017 |
| WO | WO 2017/199245 | 11/2017 |
| WO | WO 2017/199246 | 11/2017 |
| WO | WO 2017/200381 | 11/2017 |
| WO | WO 2018/060529 | 4/2018 |
| WO | WO 2018/165478 | 9/2018 |
| WO | WO 2018/178272 | 10/2018 |
| WO | WO 2018/184779 | 10/2018 |
| WO | WO 2019/002510 | 1/2019 |
| WO | WO 2019/101630 | 5/2019 |
| WO | WO 2020/053099 | 3/2020 |
| WO | WO 2020/084101 | 4/2020 |
| WO | WO 2020/201942 | 10/2020 |
| WO | WO 2020/212459 | 10/2020 |
| WO | WO 2021/016071 | 1/2021 |
| WO | WO 2021/059165 | 4/2021 |
| WO | WO 2021/144230 | 7/2021 |
| WO | WO 2021/175039 | 9/2021 |
| WO | WO 2021/191909 | 9/2021 |
| WO | WO 2021/221949 | 11/2021 |
| WO | WO 2021/258835 | 12/2021 |
| WO | WO 2022/000727 | 1/2022 |
| WO | WO 2022/000729 | 1/2022 |
| WO | WO 2022/000733 | 1/2022 |
| WO | WO 2022/000734 | 1/2022 |
| WO | WO 2022/000976 | 1/2022 |
| WO | WO 2022/000977 | 1/2022 |
| WO | WO 2022/002765 | 1/2022 |
| WO | WO 2022/019765 | 1/2022 |
| WO | WO 2022/069208 | 4/2022 |
| WO | WO 2022/086326 | 4/2022 |
| WO | WO 2022/109902 | 6/2022 |
| WO | WO 2022/109903 | 6/2022 |
| WO | WO 2022/109904 | 6/2022 |
| WO | WO 2022/109907 | 6/2022 |
| WO | WO 2022/136043 | 6/2022 |
| WO | WO 2022/161239 | 8/2022 |
| WO | WO 2022/167940 | 8/2022 |
| WO | WO 2022/184736 | 9/2022 |
| WO | WO 2022/199238 | 9/2022 |
| WO | WO 2022/235162 | 11/2022 |
| WO | WO 2022/261641 | 12/2022 |
| WO | WO 2023/277283 | 1/2023 |
| WO | WO 2023/057296 | 4/2023 |
| WO | WO 2023/099144 | 6/2023 |
| WO | WO 2023/104538 | 6/2023 |
| WO | WO 2023/115576 | 6/2023 |
| WO | WO 2023/146401 | 8/2023 |
| WO | WO 2023/152688 | 8/2023 |
| WO | WO 2023/191380 | 10/2023 |
| WO | WO 2023/224369 | 11/2023 |
| WO | WO 2022/228464 | 12/2023 |
| WO | WO 2024/022809 | 2/2024 |
| WO | WO 2024/023048 | 2/2024 |
| WO | WO 2024/034748 | 2/2024 |
| WO | WO 2024/074309 | 4/2024 |
| WO | WO 2024/083538 | 4/2024 |
| WO | WO 2024/121060 | 6/2024 |
| WO | WO 2024/151926 | 7/2024 |
| WO | WO 2024/156859 | 8/2024 |
| WO | WO 2024/160583 | 8/2024 |
| WO | WO 2024/177428 | 8/2024 |
| WO | WO 2024/200348 | 10/2024 |
| WO | WO 2024/230129 | 11/2024 |
| WO | WO 2024/240737 | 11/2024 |
| WO | WO 2024/244323 | 12/2024 |
| WO | WO 2024/254971 | 12/2024 |
| WO | WO 2024/238747 | 1/2025 |
| WO | WO 2025/002905 | 1/2025 |
| WO | WO 2025/023995 | 1/2025 |
| WO | WO 2025/032545 | 2/2025 |
| WO | WO 2025/032546 | 2/2025 |
| WO | WO 2025/039396 | 2/2025 |
| WO | WO 2025/042123 | 2/2025 |
| WO | WO 2025/044005 | 3/2025 |
| WO | WO 2025/055208 | 3/2025 |
| WO | WO 2025/060217 | 3/2025 |

(56) References Cited

FOREIGN PATENT DOCUMENTS

| WO | WO 2025/110877 | 5/2025 |
|---|---|---|
| WO | WO 2025/128004 | 6/2025 |
| WO | WO 2025/140344 | 7/2025 |

OTHER PUBLICATIONS

Andriotis et al., "A new method of three-dimensional coronary artery reconstruction from X-Ray angiography: Validation against a virtual phantom and multislice computed tomography", Catheterization and Cardiovascular Interventions, vol. 71:28-43 (2008).
Barnea, "Model-based estimation of coronary vessel diameter in angiographic images", Proceedings of the 20th Annual International Conference of the IEEE Engineering in Medicine and Biology Society, vol. 20:513-516 (1998).
Barratt et al., "Reconstruction and quantification of the carotid artery bifurcation from 3-D ultrasound images", IEEE Transactions on Medical Imaging, vol. 23(5):567-583 (2004).
Barrett et al., "Interactive live-wire 1-3 boundary extraction", Medical Image Analysis, Oxford University Press, vol. 1(4):331-341 (1997).
Bullitt et al., "Determining malignancy of brain tumors by analysis of vessel shape", Medical Image Computing and Computer-Assisted Intervention, MICCAI 2004 Conference Proceedings, Lecture notes in Computer Science, LNCS, 3217:645-653 (2004).
Caiati et al., "New noninvasive method for coronary flow reserve assessment: Contrast-enhanced transthoracic second harmonic echo doppler", Circulation, vol. 99:771-778 (1999).
Caiati et al., "Detection, location, and severity assessment of left anterior descneding coronary artery stenoses by means of contrast-enhanced transthoracic harmonic echo dopper", European Heart Journal, vol. 30:1797-1806 (2009).
Chen et al., "3-D reconstruction of coronary arterial tree to optimize angiographic visualization", IEEE Transactions on Medical Imaging, vol. 19(4):318-336 (2000).
Chung, "Image segmentation methods for detecting blood vessels in angiography", 2006 9th International Conference on Control, Automation, Robotics and Vision, Singapore, pp. 1-6 (2006).
Dickie et al., "Live-vessel: interactive vascular image segmentation with simultaneous extraction of optimal medial and boundary paths", Technical Report TR 2009-23, School of Computing Science, Simon Fraser University, Burnaby, BC, Canada, Nov. 2009.
Frangi et al., "Multiscale vessel and enhancement filtering", Medical Image Computing and Computer-Assisted Intervention, MICCA '98 Lecture Notes in Computer Science, vol. 1496:130-137 (1998).
Fraz, "Blood vessel segmentation methodologies, in retinal images—a survey", Computer Methods and Programs in Biomedicine, vol. 108:407-433 (2012).
Fusejima, "Noninvasive measurement of coronary artery blood flow using combined two-dimensional and doppler echocardiography", JACC vol. 10(5):1024-1031 (1987).
Google Maps Tips 10: Drag-and-Drop Alter Your Directions, Feb. 18, 2015, XP093093278, retrieved from the internet: https://www.youtube.com/watch?v=8pYqjiZh6gw, retrieved on Oct. 19, 2023.
Hawkes et al., "Validation of volume blood flow measurements using three-dimensional distance-concentration functions detived from digital X-Ray angiograms", Investigative Radiology, vol. 29(4):434-442 (1994).
Hoffmann et al., "Determination of instantaneous and average blood flow rates from digital angiograms of vessel phantoms using distance-density curves", Investigative Radiology, vol. 26(3):207-212 (1991).
Holdsworth et al., "Quantitative angiographic blood-flow measurement using pulsed intra-arterial injection", Medical Physics, vol. 26(10):2168-2175 (1999).
Huo et al., "Intraspecific scaling laws of vascular trees", J.R. Soc. Interface vol. 9:190-200 (2012).
Hwang et al., "Diagnostic performance of resting and hyperemic invasive physiological indices to define myocardial ischemia", JACC: Cardiovascular Interventions, vol. 10(8):751-760 (2017).
Janssen et al., "New approaches for the assessment of vessel sizes in quantitative (cardio-)vascular X-ray analysis", Int J Cardiovasc Imaging vol. 26:259-271 (2010).
Jiang et al., "Vascular tree reconstruction by minimizing a physiological functional cost", 2010 IEEE Computer Society Conference on Computer Vision and Pattern Recognition—workshops, San Francisco, CA, pp. 178-185, doi: 10.1109/CVPRW.2010.5543593.
Kappetein et al, "Current percutaneous coronary intervention and coronary artery bypass grafting practices for three-vessel and left main coronary artery disease: Insights from the SYNTAX run-in phase", European Journal of Cardio-Thoracic Surgery, vol. 29:486-491 (2010).
Kass et al., "Snakes: active contour models", Int. J. Comput. Vis. vol. 1:321-331 (1987).
Kern, "Serial lesion FFR made simple", Cath Lab Digest, vol. 20(9)(2012), in 2 pages, [retrieved on on Sep. 25, 2024], retrieved from the internet: https://www.hmpgloballearningnetwork.com/site/cathlab/articles/serial-lesion-ffr-made-simple.
Kirkeeide, "Coronary obstructions, morphology and physiologic significance", Quantitative Coronary Arteriography, Chap. 11:229-244 (1991).
Lethen et al., "Validation of noninvasive assessment of coronary flow velocity reserve in the right coronary artery—A comparison of transthoracic echocardiographic results with intracoronary doppler flow wire measurements", European Heart Journal, vol. 24:1567-1575 (2003).
Li et al., "Minimization of region-scalable fitting energy for image segmentation", in IEEE Transactions on Image Processing, vol. 17(10):1940-1949 (2008).
Marchenko, et al., "Vascular editor: from angiographic images to 3D vascular models", Journal of Digital Imaging, vol. 23:386-398 (2010).
Meimoun et al., "Non-invasive assessment of coronary flow and coronary flow reserve by transthoracic doppler echocardiography: a magic tool for the real world", European Journal of Echocardiography, vol. 9:449-457 (2008).
Mercer-Rosa et al., "Illustration of the additional value of real-time 3-dimensional echocardiography to conventional transthoracic and transesophageal 2-dimensional echocardiography in imaging muscular ventricular septal defects: does this have any impact on individual patient treatment", Journal of the American Society of Echocardiography, vol. 19(12):1511-1519 (2006).
Molloi et al., "Quantification of fractional flow reserve using angiographic image data", World Congress on Medical Physics and Biomedical Engineering, Munich, Germany, Sep. 7-12, 2009.
Molloi et al., "Estimation of coronary artery hyperemic blood flow based on arterial lumen volume using angiographic images", Int J Cardiovasc Imaging, vol. 28:1-11 (2012).
Neng et al., "Pre-stenting angiography-FFR based physiological map provides virtual intervention and predicts physiological and clinical outcomes", Catheterization and Cardio vascular Interventions, Wiley-Liss, New York, NY, vol. 101(6):1053-1061 (2023).
Ng et al., "Novel QCA methodologies and angiographic scores", Int J Cardiovasc Imaging vol. 27:157-165 (2011).
Nijjer et al., "Pre-angioplasty instantaneous wave-free ratio pull-back provides virtual intervention and predicts hemodynamic outcome for serial lesions and diffuse coronary artery disease", JACC: Cardiovascular Interventions, vol. 7(12):1386-1396 (2014).
Pellot et al, "A 3D reconstruction of vascular structures from two X-Ray angiograms using an adapted simulated annealing algorithm", IEEE Transactions of Medical Imaging, vol. 13(1):48-60 (1994).
Pijls et al., "Experimental basis of determining maximum coronary, myocardial, and collateral blood flow by pressure measurements for assessing functional stenosis severity before and after percutaneous transluminal coronary angioplasty", Circulation, vol. 87:1354-1367 (1993).
Pinho et al., "Assessment and stenting of tracheal stenosis using deformable shape models", Medical Image Analysis, vol. 15(2):250-266 (2010).
Polytimi et al., "Close to transplant renal artery stenosis and percutaneous transluminal treatment", Journal of Transplantation, vol. 2011, 7 pages (2011).

(56) References Cited

OTHER PUBLICATIONS

Rabbat et al., "Interpreting results of coronary computed tomography angiography-derived fractional flow reserve in clinical practice", Journal of Cardiovascular Computed Tomography, vol. 11(5):1-6 (2017).
Rimac et al., "Clinical value of post-percutaneous coronary intervention fractional flow reserve value: A systematic review and meta-analysis", Am Heart J. vol. 183:1-9 (2017).
Sarwal et al., "3-D reconstruction of coronary arteries", Proceedings of the 16th Annual Intl. Conference of the IEEE Engineering in Medicine and Biology Society, Engineering Advances: New Opportunities for Biomedical Engineers, Nov. 3, 1994, pp. 504-505.
Sato et al., "A viewpoint determination system for stenosis diagnosis and quantification in coronary angiogrphic image acquisition", IEEE Transactions on Medical Imaging, vol. 17(1):121-137 (1998).
Seifalian et al., "A new algorithm for deriving pulsatile blood flow waveforms tested using simulated dynamic angiographic data", Neuroradiology, vol. 31:263-269 (1989).
Seifalian et al., "Blood flow measurements using 3D distance-concentration functions derived from digital x-ray angiograms", Cardiovascular Imaging, Chap. 33:425-442 (1996).
Seifalian et al., "Validation of a quantitative radiographic technique to estimate pulsatile blood flow waveforms using digital subtraction angiographic data", Journal of Biomedical Engineering, vol. 13(3):225-233 (1991).
Shang et al., "Vascular active contour for vessel tree segmentation", in IEEE Transactions on Biomedical Engineering, vol. 58(4):1023-1032 (2011).
Shpilfoygel et al., "Comparison of methods for instantaneous angiographic blood flow measurement", Medical Physics, vol. 26(6):862-871 (1999).
Sianos et al., "The SYNTAX score: an angiographic tool grading the complexity of coronary artery disease", Euro Intervention, vol. 1(2):219-227 (2005).
Siogkas et al., "Quantification of the effect of percutaneous coronary angioplasty on a stenosed right coronary artery", 2010 10th IEEE Intl. Conference on Information Technology and Applications in Biomedicine, November 3-5, 210, pp. 1-4 (2010).
Slomka et al., "Fully automated wall motion and thickening scoring system for myocardial perfusion SPECT: Method development and validation in large population", Journal of Nuclear Cardiology, vol. 19(2):291-302 (2012).
Sprague et al., "Coronary x-ray angiographic reconstruction and image orientation", Medical Physics, vol. 33(3):707-718 (2006).
Sun et al., "Coronary CT angiography: current status and continuing challenges", The British Journal of Radiology, vol. 85:495-510 (2012).
Takarada et al., "An angiographic technique for coronary fractional flow reserve measurement: in vivo validation", International Journal of Cardiovascular Imaging, published online pp. 1-10, Aug. 31, 2012.
Termeer et al., "Visualization of myocardial perfusion derived from coronary anatomy", IEEE Transactions on Visualization and Computer Graphics, vol. 14(6):1595-1602 (2008).
Tomasello et al., "Quantitative coronary angiography in the interventional cardiology", Advances in the Diagnosis of Coronary Atherosclerosis, Chap. 14:255-272 (2011).
Tsigkas et al., "Rapid and precise computation of fractional flow reserve from routine two-dimensional coronary angiograms based on fluid mechanics: The pilot FFR2D study", Journal of Clinical Medicine, vol. 13:1-13 (2024).
Tu et al., Assessment of obstruction length and optimal viewing angle from biplane X-ray angiograms, Int J Cardiovasc Imaging, vol. 26:5-17 (2010).
Tu et al., "In vivo assessment of optimal viewing angles from X-ray coronary angiography", EuroIntervention, vol. 7:112-120 (2011).

Tu et al., "In vivo assessment of bifurcation optimal viewing angles and bifurcation angles by three-dimentional (3D) quantitative coronary angiography", Int J Cardiovasc Imaging, published online Dec. 15, 2011, in 9 pages.
Tu et al., "The impact of acquisition angle differences on three-dimensional quantitative coronary angiography", Catheterization and Cardiovascular Interventions, vol. 78:214-222 (2011).
Tuinenburg et al., "Dedicated bifurcation analysis: basic principles", Int J Cardiovasc Imaging, vol. 27:167-174 (2001).
Voci et al., "Coronary flow: a new asset for the echo lab?", European Heart Journal, vol. 25:1867-1879 (2004).
Volcano Corporation, iFR instant wave-free Ratio™, "An introduction to iFR Scout™ Pullback Measurements, Moving from Justified PCI to Guided PCI", 2015, in 11 pages, [retrieved on Aug. 29, 2024]. Retrieved from the Internet <URL: https://www.usa.philips.com/c-dam/b2bhc/master/education-resources/technologies/igt/iFR-Scout-In-Service.pdf>.
Weickert et al., "A scheme for coherence-enhancing diffusion filtering with optimized rotation invariance", Computer Vision, Graphics, and Pattern Recognition Group, Technical Report, Computer Science Series, pp. 1-20 (2000).
Weickert, "Anisotropic diffusion in image processing", ECMI, published by Teubner Stuttgart, Germany, 181 pages (2008).
Weickert et al., "A scheme for coherence-enhancing diffusion filtering with optimized rotation invariance", Journal of Visual Communication and Image Representation, vol. 13(1-2):103-118 (2002).
Wang et al., "Optimal viewing angle determination for multiple vessel segments in coronary angiographic image", IEEE Transactions on Nuclear Science, vol. 61(3):1290-1303 (2014).
Wang et al., "Global optimization angiographic viewing angles for coronary arteries with multiple segments", 35th Annual International Conference of the IEEE EMBS, pp. 2640-2643, Osaka, Japan, Jul. 3-7, 2013.
Wong et al., "Quantification of fractional flow reserve based on angiographic image data", The International Journal of Cardiac Imaging, vol. 28(1):13-22 (2012).
Wong et al., "Determination of fractional flow reserve (FFR) based on scaling laws: a simulation study", Physics in Medicine and Biology, vol. 53:3995-4011 (2008).
Wong et al., "Automated technique for angiographic determination of coronary blood flow and lumen volume", Acad. Radiol. vol. 13:186-194 (2006).
Xu et al., "Snakes, shapes, and gradient vector flow", IEEE Transactions on Image Processing, vol. 7:359-369 (1998).
Yang et al., "Attention-based multi-fidelity machine learning model for fractional flow reserve assessment", Computer Methods in Applied Mechanics and Engineering, vol. 432(117338):1-16 (2024).
Yang et al., "Novel approach for 3-D reconstruction of coronary arteries from two uncalibrated angiographic images", IEEE Transactions on Image Processing, vol. 18(7):1563-1572 (2009).
Youssef et al., "Role of computed tomography coronary angiography in the detection of vulnerable plaque, where does it stand among others?", Angiology, vol. 1(2):1000111-1-1000111-8 (2013).
Zhang et al., "Quantification of coronary microvascular resistance using angiographic images for volumetric blood flow measurement: in vivo validation", Am J Physio Heart Circ vol. 300(6):H2096-H2104 (2011).
International Search Report and Written Opinion in application No. PCT/IB2024/057717, mailed on Nov. 15, 2024, in 16 pages.
Fearon et al., "Accuracy of fractional flow reserve derived from coronary angiography", Circulation, vol. 139:477-484 (2019).
Kornowski et al., "Online angiography image-based FFR assessment during coronary catheterization: A single-center study", The Journal of Invasive Cardiology, vol. 30:1-6 (2018).
Omori et al., "Angiogram based fractional flow reserve in patients with dual/triple vessel coronary artery disease", International Journal of Cardiology, https://doi.org/10.1016/j.ijcard.2019301-072, in 6 pages (2019).
Pellicano et al., "Validation study of image-based fractional flow reserve during coronary angiography", Circ Cardiovasc Interv, downloaded on Sep. 16, 2017 at https://circinterventions.ahajournals.org, pp. 1-12 (2017).

(56) References Cited

OTHER PUBLICATIONS

The CathWorks FFRANGIO™ System, The Wayback Machine, https://web.archive.org/web/20220424014347/https://www.cahtworks/cathworks-ffrangio/, accessed on Apr. 29, 2025, in 9 pages (2022).
Witberg et al., "Diagnostic performance of angiogram-derived fractional flow reserve", JACC: Cardiovascular Interventions, vol. 13(4):488-497 (2020).
Wu et al., "Prospective and retrospective ECG gating for thoracic CT angiography: a comparative study", American Journal of Roentgenology, vol. 193(4):955-963 (2009).

* cited by examiner

POST-PCI CORONARY ANALYSIS

CROSS-REFERENCE TO RELATED APPLICATIONS

This application claims priority to, and is a continuation of, International Patent App. No. PCT/IB2024/057717 titled "POST-PCI CORONARY ANALYSIS" and filed on Aug. 9, 2024, which claims priority to U.S. Prov. Patent App. No. 63/518,536 titled "POST-PCI CORONARY ANALYSIS" and which was filed on Aug. 9, 2023. The entire disclosure of each of the above-identified applications is hereby incorporated herein by reference in its entirety.

BACKGROUND

Cardiovascular disease (CVD) is a leading cause of morbidity and mortality, with an estimated 244.1 million people worldwide with CVD, particularly due to the subsect of CVD, coronary artery disease (CAD). CAD can include acute coronary syndromes (ACS) and stable angina pectoris (SAP). CAD may involve a prolonged asymptomatic developmental phase, with clinical manifestations that often result in angina pectoris, acute myocardial infarction (MI), or cardiac death. The underlying mechanism that may cause CAD involves atherosclerotic lesions of the coronary arteries. Atherosclerosis is a plaque buildup that narrows the coronary arteries and decreases blood flow to the heart, resulting in ischemia or coronary stenosis.

Revascularization is the preferred therapy for patients with moderate to severe ischemia or stenosis, resulting in significant improvements for the patient. Revascularization strategies include many techniques such as open-heart surgery, coronary artery bypass grafting (CABG), and percutaneous coronary intervention (PCI) methods such as balloon angioplasty, bare-meta stents (BMS), and first- and second-generation drug-eluting stents (DES). The severity of CAD can be assessed through vascular computer models.

SUMMARY

The disclosure generally contemplates systems and methods for determining the effectiveness of percutaneous coronary intervention (PCI) using non-invasive techniques.

In some aspects, the techniques described herein relate to a method implemented by a system of one or more processors, the method including: accessing a plurality of angiographic images depicting at least one vessel of a patient's heart, the angiographic images including at least one post-percutaneous coronary intervention (post-PCI) images and one or more diagnostic images, wherein the post-PCI images depict a PCI-treated location is included to revascularize a lesion, and wherein the diagnostic images depict the lesion; receiving information specifying positions of the PCI-treated location in the post-PCI images; determining an index indicative of vascular function based on the angiographic images, wherein the index is derived based on a three-dimensional model (3-D) of the at least one vessel of the patient's heart, and wherein individual portions of the diagnostic images depicting the lesion are masked during generation of three-dimensional model; and presenting, via a user interface, summary information associated with PCI, the summary information including at least the determined index.

In some aspects, the techniques described herein relate to a method, wherein receiving information specifying the positions of the PCI-treated location includes presenting the post-PCI images via the user interface and receiving the information via user input.

In some aspects, the techniques described herein relate to a method, wherein receiving the information specifying the positions of the PCI location in the post-PCI images includes the system determining the positions of the PCI-treated location based on analyzing the post-PCI images.

In some aspects, the techniques described herein relate to a method, wherein the three-dimensional model is generated based on matching features included in the angiographic images, and wherein the portions of the diagnostic images depicting the lesion are not used to generate the index.

In some aspects, the techniques described herein relate to a method, wherein the positions of the PCI location are matched to corresponding positions of the diagnostic images, and wherein the corresponding positions are masked.

In some aspects, the techniques described herein relate to a method, wherein the index is a fractional flow reserve value.

In some aspects, the techniques described herein relate to a method, wherein the index is compared to a different index determined based on a set of diagnostic images depicting the at least one vessel of the patient's heart, and wherein the comparison is included in the summary information.

In some aspects, the techniques described herein relate to a method, wherein the user interface includes: a first portion associated with the different index, the first portion including: the different index, and a graphical representation of the at least one vessel, wherein colors are assigned to portions of the at least one vessel based on respective index drops associated with the different index, and a second portion associated with the index, the second portion including: the index, and a graphical representation of the at least one vessel, wherein colors are assigned to portions of the at least one vessel based on respective index drops associated with the index.

In some aspects, the techniques described herein relate to a method, wherein the set of diagnostic images includes at least one of the one or more diagnostic images and at least one other diagnostic images.

In some aspects, the techniques described herein relate to a method, wherein the summary information includes a marked post-PCI index associated with a user-selected portion of the 3-D model and a marked diagnostic index associated with a corresponding portion of a diagnostic 3-D model based on the set of diagnostic images.

In some aspects, the techniques described herein relate to a method, wherein the summary information includes the 3-D model and a diagnostic 3-D model based on the set of diagnostic images, the 3-D model and the diagnostic 3-D model presented at a same viewing angle.

In some aspects, the techniques described herein relate to a method, further including: adjusting at least one value in the summary information associated with PCI via the user interface, presenting the adjusted at least one value via the user interface, and in response to adjusting the at least one value, present an adjustment to a corresponding value in the summary information associated with the set of diagnostic images for comparison.

In some aspects, the techniques described herein relate to a method, further including presenting, via the user interface, the plurality of angiographic images, the positions of the PCI-treated location in the post-PCI images and the individual portions of the diagnostic images depicting the lesion that are masked.

In some aspects, the techniques described herein relate to a method, wherein the one or more diagnostic images is automatically selected from a plurality of diagnostic images based on a score determined by comparing each diagnostic image of the plurality of diagnostic images with the at least one post-PCI images.

In some aspects, the techniques described herein relate to a method, wherein the plurality of diagnostic images includes a set of diagnostic images used to determine a diagnostic index indicative of vascular function, the set of diagnostic images depicting the at least one vessel of the patient's heart captured at a time prior then when the at least one post-PCI images were captured.

In some aspects, the techniques described herein relate to a method, further including presenting, via the user interface, a set of angiographic images, wherein the plurality of angiographic images are accessed from the set of angiographic images.

In some aspects, the techniques described herein relate to a method, further including filtering the set of angiographic images into subsets based on at least one of a quality score for each angiographic image or a time stamp for each of the angiographic image.

In some aspects, the techniques described herein relate to a method, wherein angiographic images in the subsets cannot be accessed for the plurality of angiographic images.

In some aspects, the techniques described herein relate to a system including one or more processors and non-transitory computer storage media storing instructions that when executed by the one or more processors, cause the one or more processors to perform the method.

In some aspects, the techniques described herein relate to non-transitory computer storage media storing instructions executed by a system.

The systems, methods, techniques, modules, and devices of this disclosure each have several innovative aspects, no single one of which is solely responsible for the desirable attributes disclosed herein.

BRIEF DESCRIPTION OF THE DRAWINGS

Throughout the drawings, reference numbers are re-used to indicate correspondence between referenced elements. The drawings are provided to illustrate instances of the subject matter described herein and not to limit the scope thereof.

DETAILED DESCRIPTION

Overview

Figure 1:
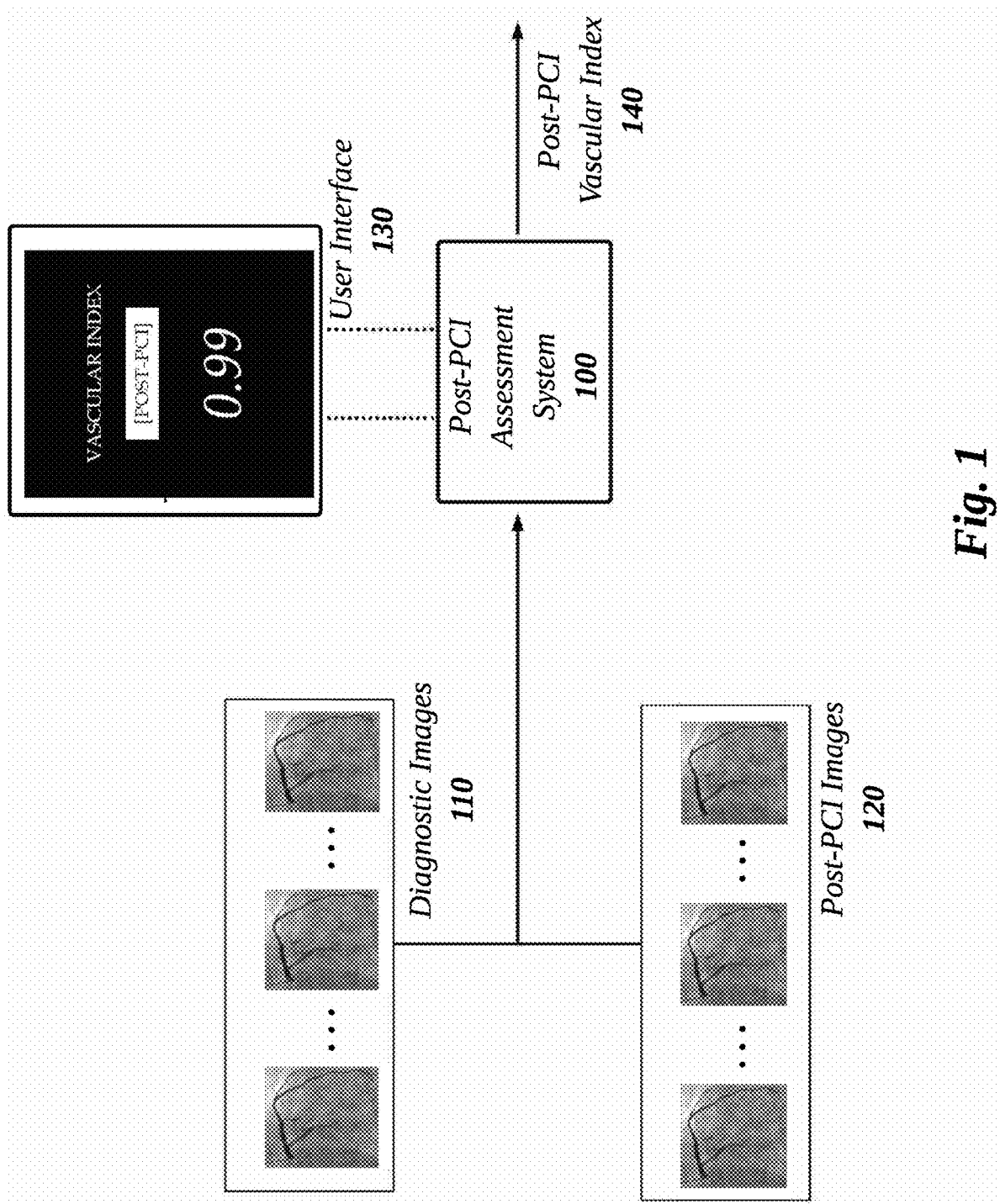
FIG. 1 is a block diagram of an example post-PCI assessment system determining a post-PCI vascular index for inclusion in a post-PCI assessment.

This specification describes techniques to determine the effectiveness of percutaneous coronary intervention (PCI) using non-invasive techniques. PCI may include placing a PCI-treatment in a PCI-treated location, such as a lesion. An example PCI-treatment may include use of a stent. To provide for assurance that PCI was effective, this specification describes simplified user interface flows and back-end features to enable the quick, and accurate, quantification of the effectiveness. In some instances, one or more indices indicative of vascular function may be determined based on angiographic images of a patient's heart. An example index may include a fractional flow reserve (FFR) value. In some instances, individual indices may be determined for individual positions along a vessel in which the PCI-treatment is included. The individual positions may be discrete positions along the length of the vessel or reflect a continuous function such that for any position (e.g., length) a corresponding index may be identified. These indices may be included in an interactive user interface or report, which is referred to herein as a post-PCI assessment.

As will be described, the techniques described herein advantageously allow for use of both post-PCI images (e.g., angiographic images in which the PCI-treatment is included) and diagnostic images (e.g., angiographic images prior to inclusion of the PCI-treatment). Typically, medical professionals may obtain two post-PCI images to review the insertion of the PCI-treatment. The techniques herein allow for use of two post-PCI images, in combination with a diagnostic image, to generate a three-dimensional (3D) model of the patient's heart or a portion thereof. For example, portions of the diagnostic image that depict the lesion may be masked or otherwise ignored during the generation of the 3D model. Through analyses of this model, an accurate determination as to the index may be determined. In this way a medical professional may follow his/her normal practice and obtain information identifying the effectiveness of the PCI treatment. In another example, one post-PCI image may be used in combination with diagnostic images. In another example, only post-PCI images may be used.

Coronary physiology assessments, also known as lesion functional assessments, provide an indication of the health of the cardiac vasculature of a patient by providing characteristics of the vessels. These characteristics can be lesions that may be an indication of whether atherosclerosis or other forms of CAD are present. Quantitative coronary angiography (QCA) is a minimally invasive coronary physiology assessment that can determine the characteristics of the cardiac vasculature using medical images obtained during a procedure.

The medical images can be 2-dimensional (2D) angiographic images. For example, as described above many medical professionals may routinely capture two angiographic images during a PCI procedure for revascularization that illustrate one or more PCI-treatments (e.g., stents) placed to correct one or more lesions in the vessels. p These post-PCI angiographic images can be used in conjunction with diagnostic angiographic images to generate vascular characteristics of the PCI-placed cardiac vasculature. The diagnostic angiographic images may have been captured during an assessment evaluation prior to the PCI procedure (referred to herein as a diagnostic assessment), such as during a catheterization procedure or a diagnostic coronary physiology assessment of the cardiac vasculature. The vascular characteristics included in the assessment can include one or more indices indicative of vascular function (e.g., fractional flow reserve (FFR)) or one or more index drops (e.g., reductions in FFR value) at the location of the PCI to indicate whether the PCI was effective for revascularization. Additionally, the assessment can also include additional information related to the cardiac vasculature shown in the angiographic images, including but not limited to, pullback graphs, vessel diameter graphs, 3D models, marked and unmarked angiographic images, color charts, and other measures of vascular health.

Description related to determining or calculating an index indicative of vascular function and determining a three-dimensional model, and so on, is included in U.S. Pat. Nos. 10,595,807 and 11,138,733, and which are hereby incorporated herein by reference in their entireties.

As will be described, a system described herein (e.g., the post-PCI assessment system 100) may determine post-PCI assessments for presentation to users. As described herein, a post-PCI assessment may include information relevant to determining whether a PCI was effective. As described above, example information may include a pullback graph (e.g., element 519 of FIG. 5B). As known by those skilled in the art, the pullback graph may map indices indicative of vascular function (e.g., FFR values) to lengths along a vessel. In some instances, the Y-axis may represent an index value or a reduction or drop in index and the X-axis may represent the length along the vessel. For example, the pullback graph may reflect a line that starts at an initial length along a vessel (e.g., proximal to a lesion in the vessel) and ends at a length proximate to an end of the vessel (e.g., distal to the lesion). Thus, the line may start at a particular Y-axis value (e.g., 1) and then lower along the length of the vessel. The information may also include a three-dimensional (3D) model of a portion of the vasculature that includes the PCI. The 3D model, such as illustrated in FIG. 5B, may graphically describe the indices indicative of vascular function across the length of vessels that include the PCI-treatment. For example, portions of the 3D model may be assigned colors based on the indices (e.g., a lower index, or higher index drop, may be associated with a particular color such as red).

Advantageously, the disclosed technology allows for comparisons between a diagnostic assessment (e.g., generated before the PCI based on diagnostic images) and a post-PCI assessment. For example, a patient may have had diagnostic images taken and the system may have analyzed the images. In this example, patient data reflecting an index, or indices, indicative of vascular function prior to performance of the PCI, using the diagnostic images, may have been generated. The system may compare these two assessments to measure the effectiveness of the PCI.

As one example, a diagnostic index indicative of vascular function and a post-PCI index may be compared. These indices may be associated with a location of a lesion and the location of the PCI-treatment to address the lesion. For example, the location may correspond to a length along a vessel a threshold distance after the lesion. As another example, the location may correspond to a length along the vessel in the middle or center of the lesion. As another example, the diagnostic index may represent an average index value across a length associated with the lesion. The system may present comparisons between the indices to a user, such as via a user interface or report, as illustrated in FIG. 5C.

Additional comparisons may relate to index drops (e.g., reductions in index value) along the length of a vessel. For example, the system may compare the pullback graphs generated for the diagnostic assessment and the post-PCI assessment. The system may also compare one or more of the qualities of the vessel that includes the lesion, such as diameters of the vessel along its length (e.g., along the length of the lesion), metrics regarding the vessel affected by stenosis (e.g., regions and total percentage of the vessel affected by stenosis), and comparisons between the diagnostic and post-PCI 3D models of the cardiac vasculature.

The technology for post-PCI assessment in this disclosure improves upon traditional techniques and technology, which can be inflexible. Advantageously, the systems and methods described herein provide a fast response and assessment after a PCI-treatment has been placed. Current techniques for post-PCI assessment can be time consuming and may not provide an immediate technique by which to assess whether a PCI-treatment was successfully placed or if the underlying cause for the PCI was satiated. In comparison, the systems and methods described herein can provide an indication of vascular health by determining the long-term effects of the placed PCI-treatment.

"QCA" is not intended to be limiting and may be used to refer to any other minimally invasive coronary physiology assessment, such as 2D radiography, 3D quantitative assessments, etc.

"PCI" and "Post-PCI" are not intended to be limiting to only a percutaneous coronary intervention and the state after PCI has been performed but may refer to any revascularization.

"Ischemia," "stenosis," and/or "coronary stenosis" are not intended to be limiting and may be interchanged or refer to any other condition related to the narrowing of the vessels that may be treated through revascularization. "Lesions" refer to the portion of the cardiac vasculature where the vessel is narrower and is not intended to be limited to relating to ischemia or coronary stenosis but to any CAD.

"Stent" is not intended to be limiting and may refer to any other method of widening a vessel, whether by physical intervention, chemical intervention, any other intervention, or a combination of interventions. Although "stent" is used in reference to PCI, this is not intended to be limiting for either, and any other widening method may be utilized for PCI, or any other revascularization technique can utilize a stent.

In some instances, additionally or alternatively, the vasculature may be of another organ, for example, a kidney, a retina, and/or a brain. It should be understood, where cardiac vasculature is described in particular, that implicit reference is also made to instances relating to the vasculature of another organ.

Block Diagrams—Post-PCI Processing System

FIG. 1 is a block diagram of an example post-PCI assessment system 100 determining a post-PCI vascular index 140 based on angiographic images 110-120. As described herein, the index 140 may correspond to an index indicative of vascular function (e.g., a fractional flow reserve (FFR) value) for a portion of a vessel (e.g., cardiac vessel) with a PCI treatment (e.g., a stent). The post-PCI vascular index 140 and/or the angiographic images 110-120 can be displayed and/or adjusted on a user interface 130. The post-PCI assessment system 100 may represent a system of one or more computers, one or more virtual machines executing on a system of one or more computers, and so on. In some instances, the post-PCI assessment system 100 may represent an application or other software executed by a computer system, such as a mobile device.

The post-PCI assessment system 100 may determine or otherwise output a post-PCI vascular index 140 based on analyzing post-PCI images 120 alone or in combination with diagnostic image(s) 110. The post-PCI vascular index 140 may represent at least one index, such as the FFR value, for a portion of a patient's vasculature. For example, the system 100 may determine an FFR value subsequent to a PCI-treatment (e.g., a threshold distance from the treatment along the length of a vessel). The system 100 may also determine an FFR value at an end of the PCI-treatment. The system 100 may also determine an average FFR value across the length of the PCI-treatment. The system 100 may also determine a pullback graph for the portion or a particular vessel that includes the PCI-treatment. As described herein, the pullback graph may map individual FFR values to positions along the length of the particular vessel. The pullback graph may include discrete FFR values or substantially continuous information such that for any length along the particular vessel, system 100 may access a corresponding FFR value.

As described above, the system 100 may obtain diagnostic images 110 subsequent to a diagnostic procedure. For example, the diagnostic procedure may include obtaining angiographic images from multiple viewpoints. As known by those skilled in the art, each viewpoint may correspond with a particular rotation and/or angle of a c-arm, or other imaging device, about a patient. The system 100 may determine a diagnostic assessment based on the images. As an example, the system 100 may generate a three-dimensional model of a portion of the patient's vasculature depicted in the angiographic images. For example, the portion may include one or more vessels, which may include one or more lesions.

As another example with respect to a diagnostic assessment, the system 100 may generate one or more indices indicative of vascular function (e.g., FFR values). As described herein, the system 100 may determine an FFR value subsequent to a lesion (e.g., a threshold distance from the lesion along the length of a vessel). The system 100 may also determine an FFR value at the end of the lesion. The system 100 may also determine an average FFR value across the length of the lesion. The system 100 may also determine a pullback graph for the portion or a particular vessel that includes the lesion. As described herein, the pullback graph may map individual FFR values to positions along the length of the particular vessel. The pullback graph may include discrete FFR values or may include substantially continuous information such that for any length along the particular vessel the system 100 may access a corresponding FFR value.

Thus, the post-PCI assessment system 100 may have access to diagnostic images 110 and/or a previously determined diagnostic assessment. As will be described, the system 100 may determine the post-PCI vascular index 140 using at least one diagnostic image 110. For example, the system 100 may use a set of post-PCI images 120 (e.g., 2 images, 3 images, and so on) along with one or more diagnostic images 110. In some instances, two post-PCI images and one diagnostic image may be used by the system 100. The system 100 may analyze the images and advantageously mask portions of the diagnostic images which have been adjusted due to PCI. For example, the lesions depicted in the diagnostic images may be masked.

In some instances, a user (e.g., a medical professional) may select the post-PCI images 120 via a user interface. An example user interface is described in more detail below with respect to the angiographic image selection screen 501 of FIG. 5A. For example, the post-PCI images 120 may represent images obtained by a medical professional after a PCI-treatment is placed to address a lesion. The user may also select one or more diagnostic images 110 for use by the system 100. In some instances, one diagnostic image may be used. The diagnostic images can include any angiographic images taken before placement of the PCI-treatment.

In some instances, and as described below, the post-PCI assessment system 100 may select a diagnostic image 110 from a set of images as a reference image. For example, the system 100 may select a diagnostic image 110 based on analyzing the post-PCI images 120. In this example, the system 100 may prefer a diagnostic image 110 which is associated with a c-arm angle that provides a viewpoint distinct from those of the post-PCI images 120 such that the images may be used to generate an accurate 3D model. The system 100 may also prefer a diagnostic image which is clear, has good contrast, and so on.

For example, the system 100 may compute scores related to one or more of clarity, contrast scores, an amount or metric associated with vessels displayed in an image, applicability to targeted portion/side of the vasculature, number of vessels marked from preexisting diagnostic assessments, percent of overlap with other selected images after selection of post-PCI images 120, and so on. In such examples, the system 100 may determine which diagnostic image 110 are suitable candidates by reviewing the diagnostic images 110 that meet a threshold score (which can be indicated by a marker on the diagnostic images 110, e.g. a green indicator for above the threshold score and a red indicator for below the threshold score). In such instances, the system 100 can then select a single diagnostic image that was captured at an angle furthest from the two selected post-PCI images 120 and use it in the post-PCI assessment. For example, the selected diagnostic image may have the highest angle score that is determined by adding the distance of angle from the first selected post-PCI image and the second selected post-PCI image. This angle score may change based on the selection of different post-PCI images.

Alternatively, the system 100 can determine a threshold angle score to determine the subset of diagnostic images 110 and/or then select the diagnostic image with the highest clarity score, contrast score, or etc.

In some instances, the system 100 can determine whether an angiographic image is a diagnostic image 110 or post-PCI image 120 based on time stamps associated with each image. For example, if an angiogram for the assessment is selected as a diagnostic image, all angiograms that have a time stamp earlier than the selected diagnostic image can be sorted as unsuitable as a post-PCI image, and similarly, if two angiograms are selected as post-PCI images then any angiogram with a time stamp after the earlier post-PCI angiogram can be sorted as unsuitable as a diagnostic image. In such instances, unsuitable angiograms can be indicated by a marker (e.g., a white indicator).

In some instances, the system 100 may select the post-PCI images based on user selection of a diagnostic image. The system 100 may similarly select the post-PCI images as described above with respect to diagnostic images. In some instances, the user may manually select both the post-PCI images and the diagnostic image. In such instances, the user can select whether an angiogram is a post-PCI image or a diagnostic images, for example, by answering a prompt after selecting the image and/or dragging the angiogram into a designated field corresponding to the type of angiogram. In such instances, the system 100 can include sorting to determine subsets of angiograms, such as suitable images based on both satisfying threshold scores and time stamps, invalid images based on not satisfying the threshold score, and unsuitable images based on not satisfying the time stamps.

The post-PCI assessment system 100 can identify the treated portion of the vessel, such as the location of a PCI-treatment, based on an image analysis of the post-PCI images 120. In such instances, the image analysis may compare the geometry of the vessels represented in the post-PCI images to determine the location of the PCI-treatment. In other instances, the location of the treated portion can be based on user input (e.g., provided to a user interface). Based on the determined treated portion, the post-PCI assessment system 100 can mask the corresponding location in the diagnostic image 110, which can be a lesion. When generating the 3D model, the masked portion of the reference diagnostic image 110 can be ignored in the calculations and modeling. Masking portions corresponding to the lesion in the reference diagnostic image 110 can increase the accuracy of indicating the correct location of the PCI treatment in the post-PCI images 120. Thus, the post-PCI images 120 may be used to determine information, such as radii or diameter of the treated portion, for the 3D model.

The post-PCI assessment system 100 can output the post-PCI vascular index 140 (e.g., a fractional flow reserve value) optionally along with other vascular characteristics in a post-PCI assessment. The post-PCI vascular index 140 indicates whether the revascularization and its long-term viability were successful. As will be described below, with respect to FIG. 5B, the post-PCI assessment can include user-friendly assessments of cardiac vasculature health for a medical professional, patients, or other interested parties, such as a color-coated 3D model of the cardiac vasculature and a vascular index color graph of a particular vessel. Additionally, the post-PCI assessment can include information and graphics related to vascular characteristics of a post-PCI vessel, which can include a 3D model, a vascular index at the treated area of the targeted vessel, a vascular index pie chart, a vessel diameter comparison graph, a pullback graph, and a post-PCI vascular index graph.

Figure 2A:
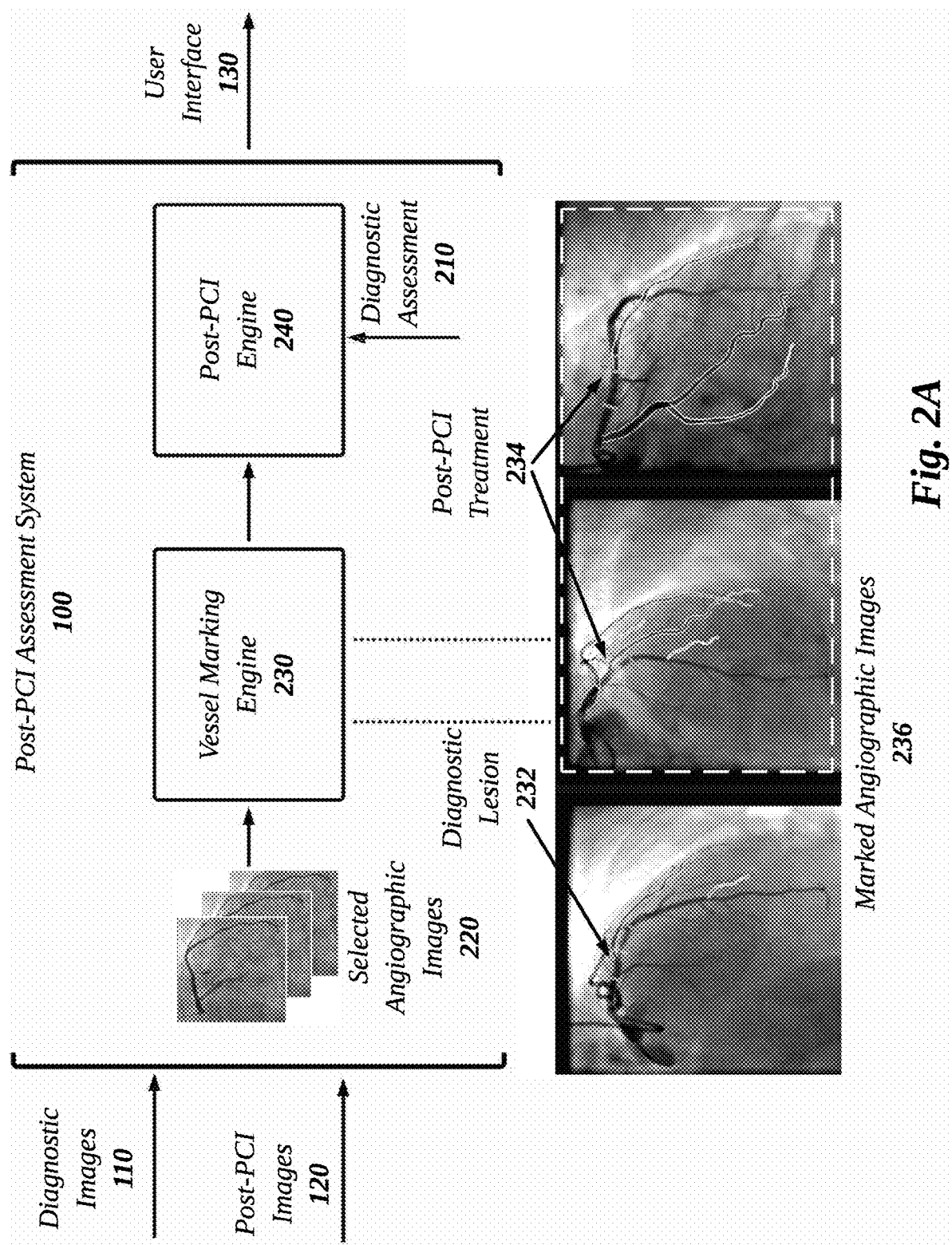
FIG. 2A is a detailed block diagram of the example post-PCI assessment system determining a post-PCI assessment.

FIG. 2A is a detailed block diagram of the example post-PCI assessment system 100 determining a post-PCI assessment. In the illustrated example, the post-PCI assessment system 100 is outputting a user interface 130, which graphically depicts the post-PCI assessment. Example user interfaces are included in FIGS. 5A-5C and described in more detail below. In the description below, a diagnostic assessment 210 is used by the system 100 to determine the post-PCI assessment. For example, a diagnostic image may be used from the assessment 210. As another example, vascular indices may compare between the diagnostic assessment 210 and post-PCI assessment. As may be appreciated, in some instances the system 100 may determine the post-PCI assessment using post-PCI images and one or more diagnostic images which have not yet been analyzed by the system 100.

With respect to a diagnostic assessment 210, a patient may have had angiographic diagnostic images taken. For example, diagnostic assessment may identify at least one lesion. As described herein, the diagnostic assessment 210 can include information and graphics related to vascular characteristics. For example, the diagnostic assessment 210 may include one or more indices indicative of vascular function (e.g., FFR values), a 3D model, and so on.

Figure 2B:
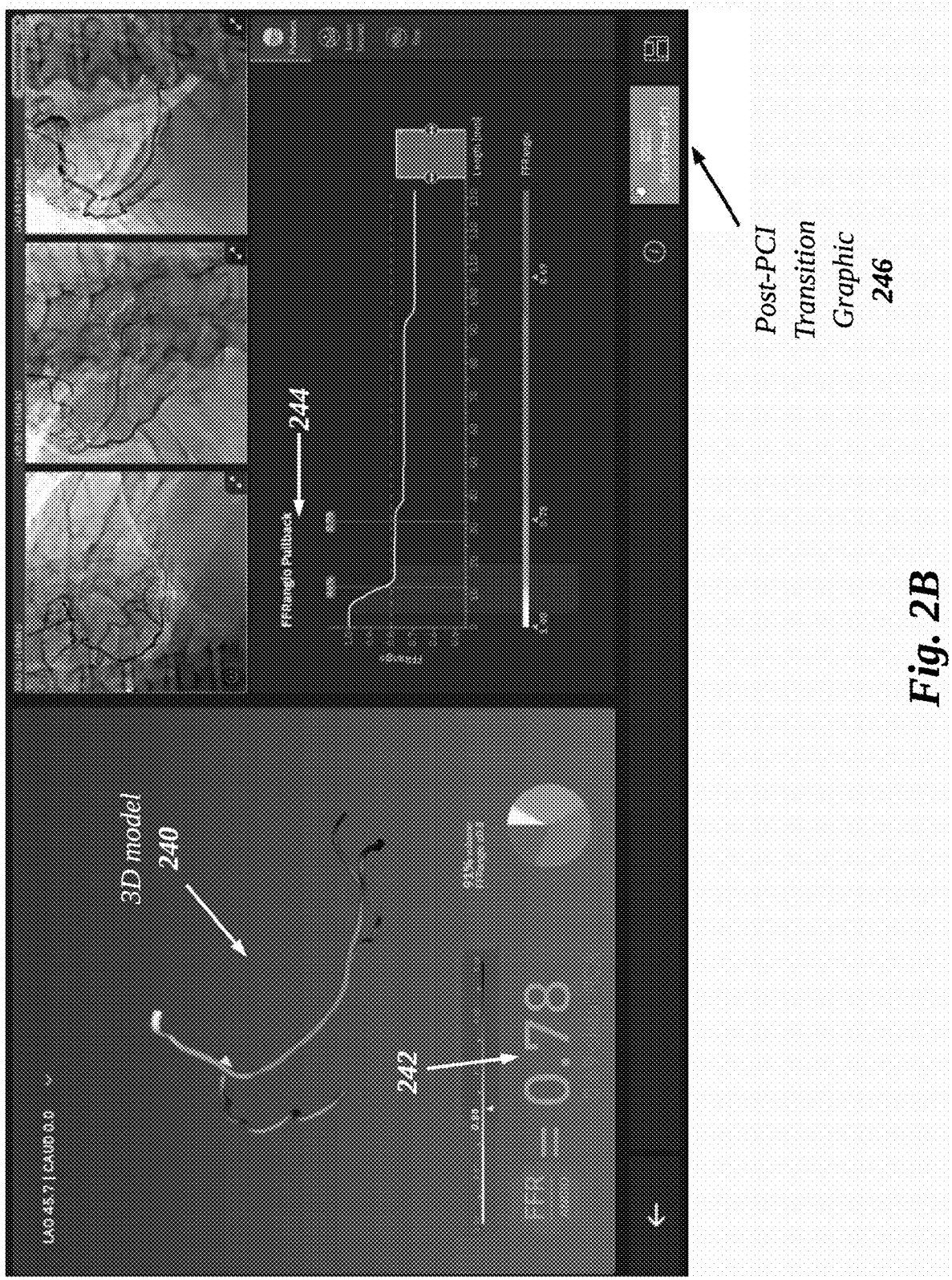
FIG. 2B is an example diagnostic assessment.

An example of a user interface that includes information associated with the diagnostic assessment 210 is illustrated in FIG. 2B. In the illustrated example, a 3D model 240 is depicted along with an index indicative of vascular function 242 which corresponds to a selection location 244 on the model 240. A pullback graph 244 is additionally included in the user interface which, as described herein, may map or otherwise associate location along a vessel with an index value (e.g., FFR value). A medical professional can use the diagnostic assessment 210 to determine how to proceed with the PCI procedure. In some instances, the diagnostic assessment 210 can indicate that PCI, or any revascularization procedure, is unnecessary. In instances PCI is applicable, as described above, the medical professional can conduct the PCI procedure to place the PCI-treatment at a location of a lesion. An example lesion 214 is illustrated in FIG. 2A with respect to a diagnostic image. After placing the PCI-treatment, the medical professional may capture the post-PCI images 120 and select at least two.

The diagnostic assessment 210, as illustrated in FIG. 2B, can include a selectable option (e.g., a post-PCI transition graphic 246) to initiate analysis for the post-PCI assessment. For example, a medical professional may view the diagnostic assessment 210 and then transition to the post-PCI analysis described herein. In this way, the diagnostic assessment 210 may facilitate the ease of moving from the diagnostic assessment to the post-PCI assessment.

With respect to FIG. 2A, the medical professional can obtain the post-PCI images 120 similarly to obtaining the diagnostic images 110 during the beginning of the catheterization procedure. A diagnostic image may then be selected for the post-PCI assessment. For example, if it is the same cardiac vasculature, the system may access one of the diagnostic images 110 used to generate the diagnostic assessment 210. The post-PCI assessment can occur immediately after the processing of the diagnostic assessment if the post-PCI images 120 are ready. The medical professional can either re-analyze diagnostic images 110 for the diagnostic assessment 210 or open a saved copy of the diagnostic assessment 210. Alternatively as described above, the medical professional can run the diagnostic assessment 210 to determine where to perform the PCI procedure and capture the post-PCI images 120 after the PCI procedure to run the post-PCI assessment.

Thus, a set of selected angiographic images 220 may be obtained which includes post-PCI images 120 and at least one diagnostic image. As described herein, portions of the post-PCI images 120 that depict the location of the PCI-treatment (e.g., stent) may be identified (e.g., marked by a medical professional, automatically detected by the system 10). For example, a vessel marking engine 230 may effectuate the identification. In this example, the engine 230 may use machine learning techniques (e.g., a convolutional or attention-based network) to identify a portion of the image which depicts the PCI-treatment. The engine 230 may additionally identify corresponding portions of the diagnostic image which depict the location prior to inclusion of the PCI treatment (e.g., a location of a lesion). In some instances, a medical professional may identify or otherwise mark the location of the lesion. In some instances, the system 100 may identify the location of the lesion based on stored information from the diagnostic assessment 210. For example, the assessment 210 may indicate that the lesion is located in a particular portion of the diagnostic image. In the illustrated example, the engine 230 has identified diagnostic lesion 232 and post-PCI treatment 234 to form marked angiographic images 236.

Figure 5A:
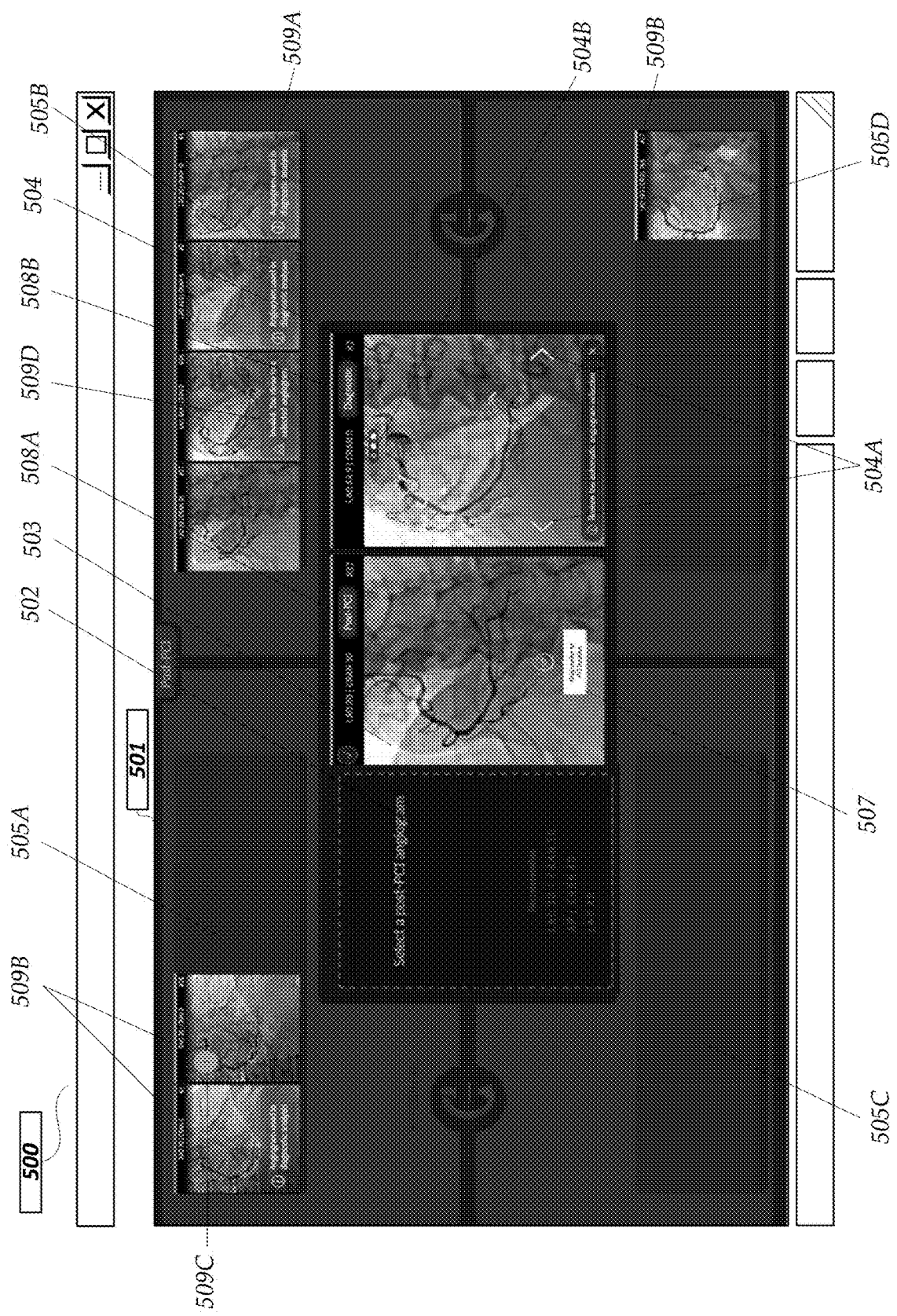
FIG. 5A is a user interface illustrating an angiographic image selection screen.
Figure 5B:
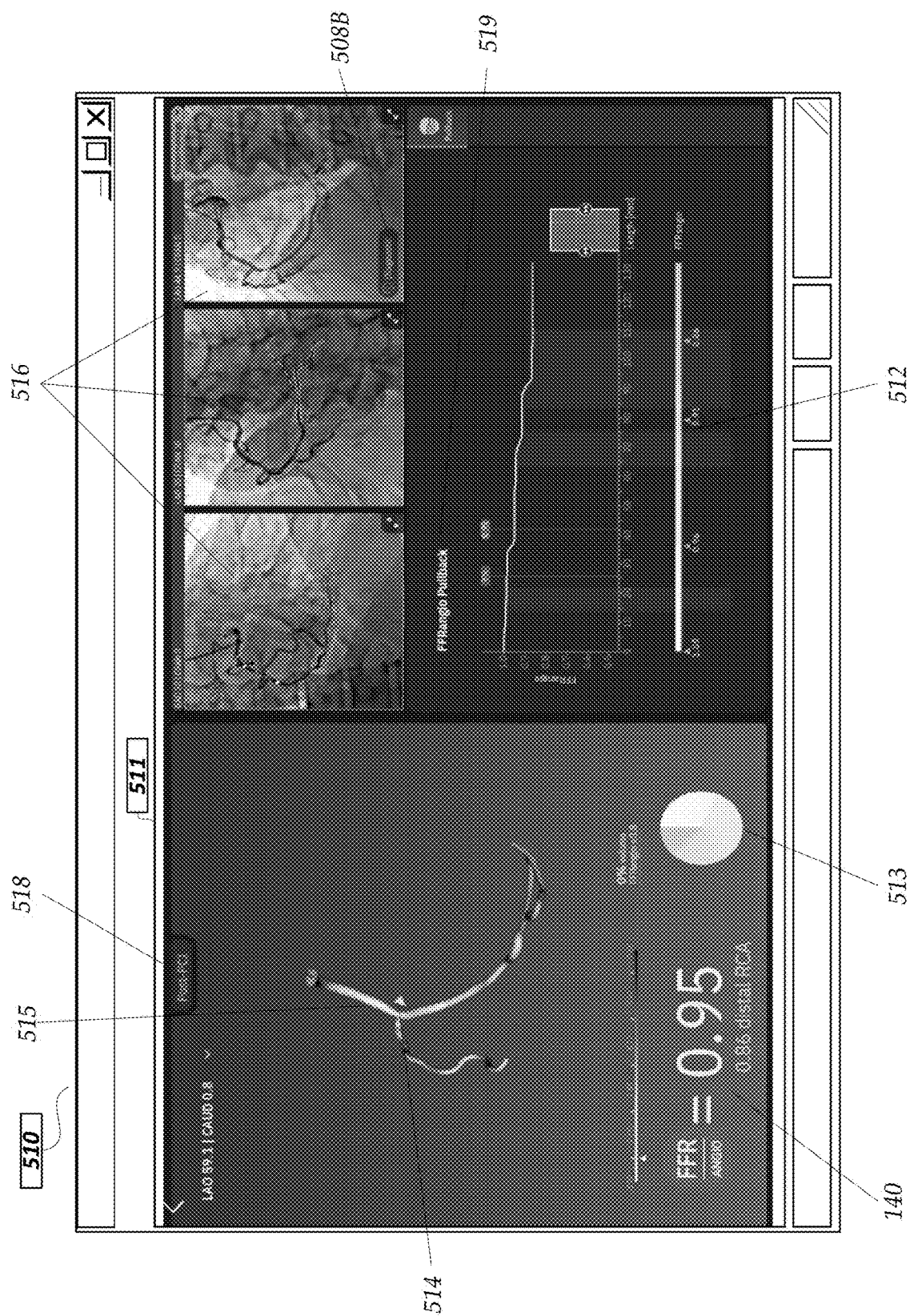
FIG. 5B is a user interface illustrating an example post-PCI assessment.
Figure 5C:
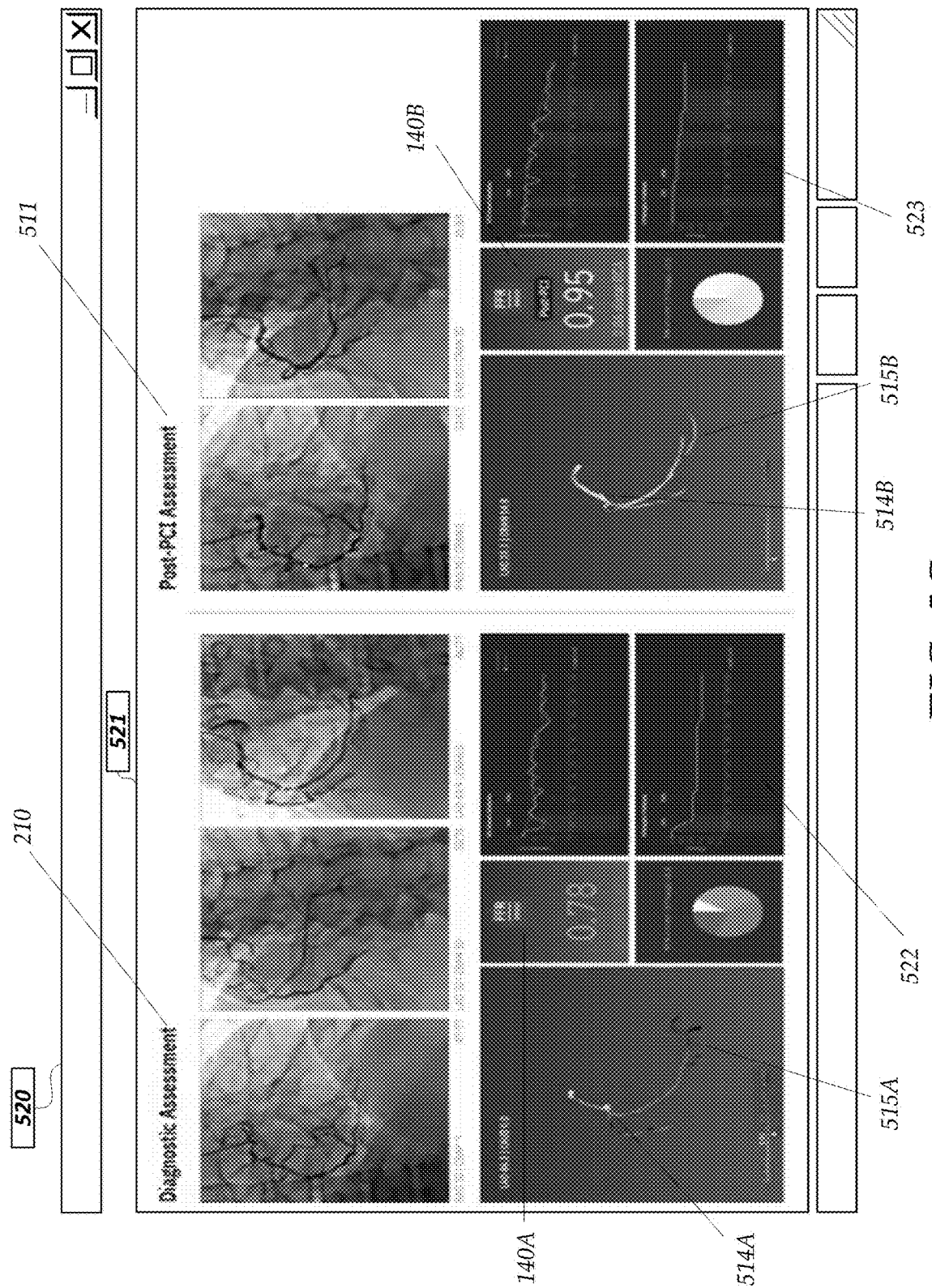
FIG. 5C is a user interface illustrating an example comparison between a diagnostic assessment and the example post-PCI assessment.

In some instances, the system 100 may respond to user input which selects the location for the post-PCI treatment 234 using a PCI marker (e.g., element 507 as illustrated in FIG. 5A). After selecting the location of the PCI marker, the vessel marking engine 230 can generate vessel markings such those in marked angiographic images 236. The vessel marking can include markings for the PCI location, ostium, selected vessel, major side branch vessels, etc. In such instances, the location of the lesion 232 can also be manually selected or automatically determined by the vessel marking engine 230, such as by using a previously selected location during the diagnostic assessment 210. The markings of the diagnostic image can be generated by the vessel marking engine 230 based on the determined location of the lesion 232 or by using previously determined markings during the diagnostic assessment 210. The markings related to the lesion 232 can be displayed to the user to indicate that they will be masked during the post-PCI assessment. The marking may represent information which indicates locations of the lesion 232 and post-PCI treatment 234 in the images 236. In some instances, the graphical markings may be presented in the user interface in different colors.

Thus, the system 100 may generate a post-PCI assessment using, in some instances, a combination of post-PCI images and diagnostic images. For example, two post-PCI images and one diagnostic image may be used.

The system 100 may then present a user interface 130 displaying the post-PCI assessment. An example post-PCI assessment is illustrated in FIG. 5B. In some instances, the user interface 130 can further compare the post-PCI assessment and diagnostic assessment 210. An example of such a comparison is illustrated in FIG. 5C and includes summary information related to the diagnostic and post-PCI assessments in a same user interface. For example, the summary information may include a diagnostic index indicative of vascular function (e.g., diagnostic FFR value) and a post-PCI index indicative of vascular function (e.g., post-PCI FFR value). In some instances, the comparison may indicate an extent to which the post-PCI treatment improved the index indicative of vascular function (e.g., fractional flow reserve value). A medical professional can utilize this to determine in real time what effect the treatment, such as surgery, had on the ischemia.

Example Flowcharts

Figure 3:
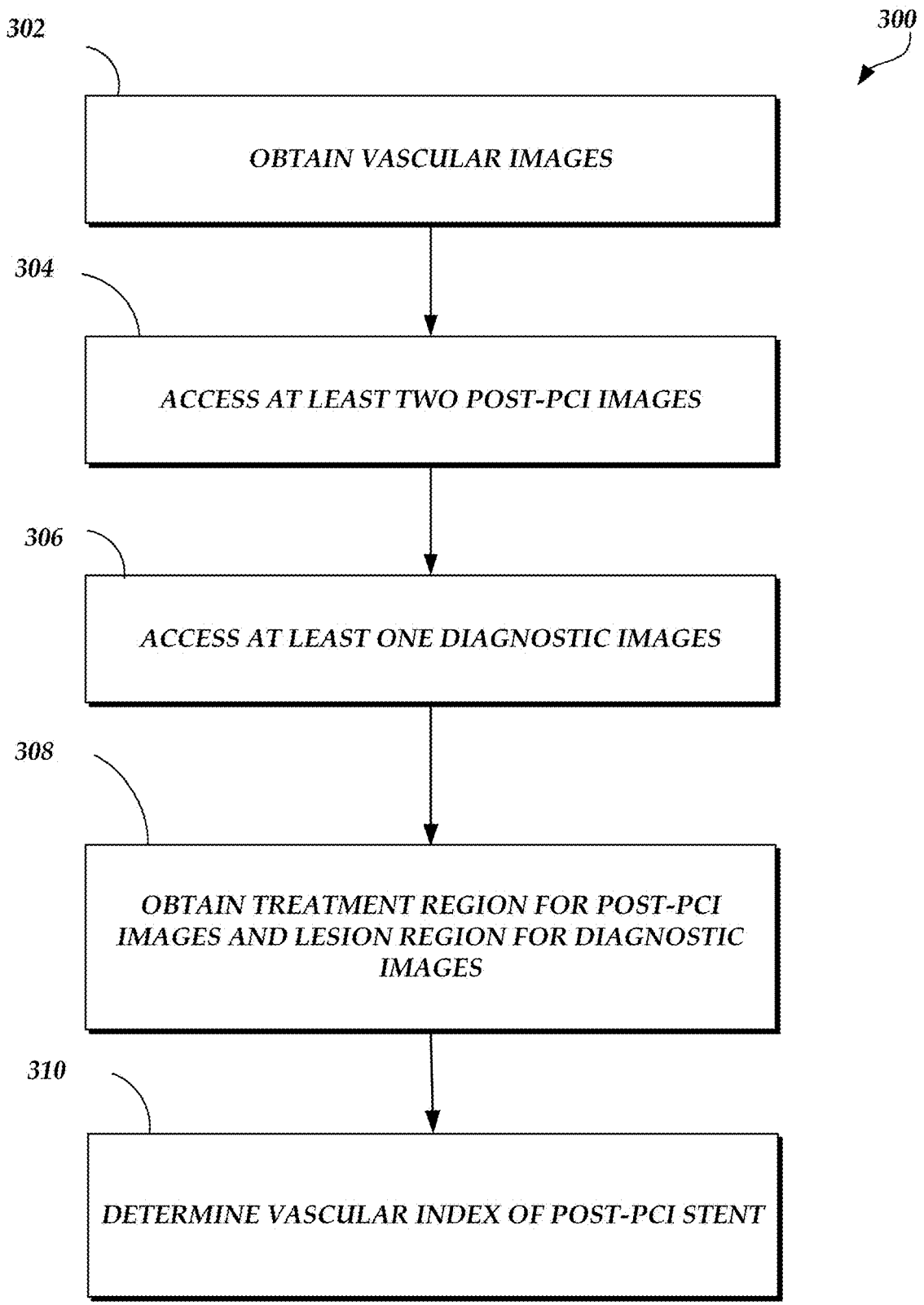
FIG. 3 is a flowchart of an example process for determining one or more post-PCI vascular indices for inclusion in a post-PCI assessment.

FIG. 3 is a flowchart of an example process 300 for determining the post-PCI vascular index. For convenience, process 300 will be described as being performed by a system of one or more computers (e.g., the post-PCI assessment system 100).

At block 302, the system obtains vascular images. As described above, the vascular images can be 2D angiographic images captured during the PCI procedure for the post-PCI images and during catheterization for the diagnostic images. In some instances, the vascular images can only be post-PCI images.

At block 304, the system accesses at least two post-PCI images. As described above, the post-PCI images can be selected by the user or determined by the system based on a prior diagnostic assessment. The post-PCI images can be obtained during the PCI procedure.

At block 306, the system accesses at least one diagnostic image. As described above, the diagnostic image can be selected by a user, determined by the system based on the accessed post-PCI images, or accessed from the diagnostic images used for a diagnostic assessment. In instances that may only use post-PCI images, block 306 can be skipped, or at least one diagnostic image can be replaced with access to at least one other post-PCI image.

At block 308, the system identifies portions of the post-PCI images which depict the PCI-treatment. The system also identifies portions of the diagnostic image which depict a diagnostic lesion that has been addressed using the PCI-treatment.

The system thus masks the portions of the diagnostic image which depict the diagnostic lesion. For example, the system may match image features between the post-PCI images and diagnostic images. Masking may include, for example, the system storing information indicating that the lesion location is not to be used when generating a three-dimensional model. That is, since the dimensions of the lesion (e.g., the diameter of the vessel at the lesion location) have been changed, the system may ignore the portion of the diagnostic image depicting the lesion. In some instances, a user may identify the lesion location. In some instances in which the system has previously analyzed diagnostic images to generate a three-dimensional model the system may access information indicating the location of the lesion.

As mentioned above, in some instances, the system can use only the two post-PCI images to generate the three-dimensional model. In such instances, the two post-PCI images can be captured at two different viewpoints and/or angles. Description related to generating a three-dimensional model of a vasculature is included in U.S. Pat. No. 9,814,433, and incorporated herein by reference in its entirety.

At block 310, the system determines the PCI vascular index of a post-PCI assessment. For example, the vascular index may represent a fractional flow reserve (FFR) value. In this example, the system may determine geometry information associated with vessels depicted in the images. The geometry information may inform diameters or radii of individual locations of the vessels. As described herein, FFR values may thus be determined based on, in part, on the geometry information. As described above, the system may determine a multitude of vascular indices such as individual FFR values which map individual locations along a length of a vessel which includes a PCI-treatment. These determined indices may be used to form a pullback graph which is illustrated in FIG. 5B.

In some instances, the post-PCI assessment can include other vascular characteristics. As described above, the vascular index of the post-PCI assessment can include the PCI vascular index and/or the post-PCI vascular index graph. The post-PCI vascular index graph can be used to analyze the overall revascularization of the vessel and ischemia. The PCI vascular index can be indicative of revascularization of the former lesion and, based on an FFR threshold, indicative of long-term revascularization. Examples of a post-PCI assessment are illustrated in FIGS. 5B-5C.

Figure 4:
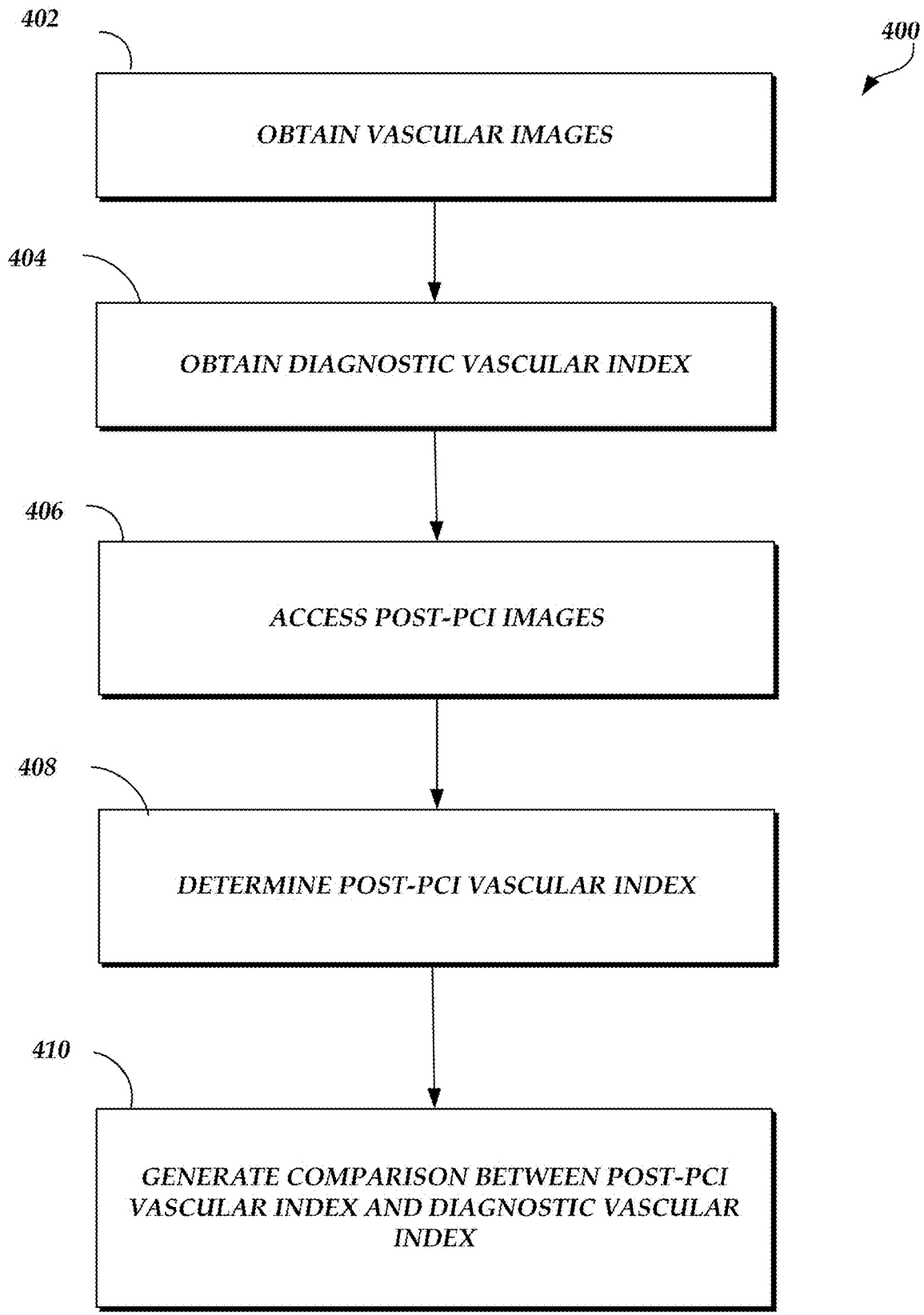
FIG. 4 is a flowchart of an example process for determining a post-PCI assessment using a diagnostic assessment.

FIG. 4 is a flow chart of an example process 400 for comparing the post-PCI vascular index and the diagnostic vascular index. The description in process 400 may be included with respect to process 300 of FIG. 3 and vice versa. For convenience, the process 400 will be described as being performed by a system of one or more computers (e.g., the post-PCI system 100).

At block 402, the system obtains vascular images. As described above, the vascular images can be 2D angiographic images captured during the PCI procedure for the post-PCI images and during catheterization for the diagnostic images. In some instances that both occur during the same procedure, obtaining the post-PCI images occurs after block 404 because the PCI procedure may only occur after the diagnostic assessment indicates a need.

At block 404, the system obtains the diagnostic vascular index as part of the diagnostic assessment. The system can also obtain other vascular characteristics in the diagnostic assessment. As described above, the system can generate the diagnostic assessment by inputting diagnostic images into a diagnostic processor. In instances where the diagnostic assessment does not result in the PCI procedures occurring during the catheterization process, the system can obtain the diagnostic vascular index from a previously performed diagnostic assessment.

At block 406, the system accesses the post-PCI images. As described above, the post-PCI images can be selected by the user or determined by the system based on a prior diagnostic assessment in block 404. The system can also access a reference diagnostic image, which can be selected by a user, determined by the system based on the accessed post-PCI images, or accessed from the diagnostic images used for a diagnostic assessment.

At block 408, the system obtains the PCI vascular index as part of the post-PCI assessment. The system can also obtain other vascular characteristics in the post-PCI assessment. As described above, the system can generate the diagnostic assessment using the post-PCI engine to generate a 3D model and calculate vascular characteristics using said 3D model and the inputted vascular images. The system can display the post-PCI assessment to the user.

At optional block 410, the system can generate a comparison between the PCI vascular index and diagnostic vascular index. As described above, the post-PCI comparison can be used by a medical professional to determine the effect of the PCI on vascularization and whether the PCI has long-term vascularization viability. In some instances, the comparison could be a comparison of the vascular index at a point associated with the treated area of the post-PCI assessment and the point associated with the lesion of the diagnostic assessment. In some instances, the comparison can be between the aggregation and/or average of the points associated. In some instances, the comparison can include the full post-PCI assessment and full diagnostic assessment, or any part thereof.

Example User Interfaces

FIGS. 5A-C illustrates example user interfaces identifying aspects of the features described herein. These user interfaces may be rendered partially by a computer system implementing the post-PCI assessment system 100. The user interfaces may additionally represent front end user interfaces associated with a web application, such as presented on a user device.

FIG. 5A is a user interface 500 illustrating an example angiographic image selection screen 501 for the post-PCI assessment system. In the illustrated example, the user interface 500 includes information requesting the selection for an unselected post-PCI image 502 and illustrating a selected post-PCI image 503 and a carousel subset for the selected diagnostic image 504. These images may be from different viewpoints (e.g., c-arm angles) about a patient. The user interface 500 illustrates that the selected post-PCI image 503 is a post-PCI image by displaying the post-PCI indicator 508*a* and that the selected diagnostic image 504 is a diagnostic image by displaying the diagnostic indicator 508*b*.

In some instances, upon selection of two post-PCI images 502-503 the user interface 500 may update with an automated selection of a third post-PCI image or a diagnostic image. For example, in some instances a user may select the two post-PCI images first such that a diagnostic image has not yet been selected. As described above, the non-selected angiograms shown in the four angle quadrants 505*a-d* (e.g., aside from those with the used diagnostic image indicator 509*a*) can include a suitability indicator 509*b* based on threshold scores and timing stamps. Additionally, angiograms that are determined be invalid can further display an invalid message 509*d*. In some instances, the system can automatically select angiograms based on further evaluating subsets of angiograms indicated to be suitable. The non-selected angiograms can further be sorted as shown in FIG. 5A according to the angle (e.g., c-arm angle) the angiogram was captured (e.g. the four angle quadrants 505*a-d*). In some instances, the system can be implemented with a single post-PCI image. For example, the diagnostic image may be selected based on the different viewpoints (e.g., the c-arm angle of the diagnostic image may be a threshold angle from the post-PCI c-arm angles), as described above.

When determining a post-PCI assessment after the diagnostic assessment 210, for example triggered based on interaction with the post-PCI transition graphic 211, the diagnostic images 110 used in the diagnostic assessment 210 can be automatically selected for the post-PCI assessment. In some instances, a diagnostic assessment is selected from one of three, or a threshold number of, diagnostic images used for the diagnostic assessment. As shown in FIG. 5A, the diagnostic images can be carouseled as a selected diagnostic image 504, which can be shuffled through using the carousel buttons 504*a* and indicating which of the diagnostic images via the carousel indicator 504*b*. The diagnostic images 110 included in the carousel subset may be indicated in the angiograms shown in the four angle quadrants 505*a-d* by a carousel marker 509*c*, which can be numbered from one through three to correspond with the carousel indicator 504*b*. In some instances, the system will automatically select the diagnostic images from this carousel subset after the user has selected two post-PCI images, such as by comparing the highest angle score or the other techniques described above. In some instances, the carousel indicator may display a check mark (not shown) on the dot corresponding to the diagnostic image selected by the system.

As another example, instead of positioning the diagnostic images into the selected diagnostic image 504 spot, the system may select all three diagnostic images individually and have the user manually un-select the diagnostic images that will not be used for the post-PCI assessment and replace them with post-PCI images 120. Additionally, the non-selected angiograms in the four angle quadrants 505*a-d* (aside from those with the used diagnostic image indicator 509*a* as part of the carousel subset, or in some instances, selected as a post-PCI image) with the used image indicator 509*a*) can be sorted using the time stamps of the carousel subset, such as by determining that all angiograms with a time stamp after the latest diagnostic image in the carousel subset are post-PCI images as the medical professional may have performed the PCI procedure immediately after or soon after running the diagnostic assessment. In some instances, a user may be prevented from diagnostic images in the carousel subset as a post-PCI image and/or be prevented from using invalid and/or unsuitable angiograms. In some instances, the angiographic image selection screen 501 can include a filtering button (not shown) to show or hide subset of angiograms in the four angle quadrants 505*a-d*, such as according to the suitability indicator 509*b*.

When running the post-PCI assessment without running the diagnostic assessment 210 (not shown), the three areas to select angiograms, which are illustrated in FIG. 5A as unselected post-PCI image 502, selected post-PCI image 503, and selected diagnostic image 504, may each appear more similarly to the unselected post-PCI image 502. One of the three areas can say "Select a diagnostic angiogram" instead of "Select a post-PCI angiogram." In some instances, angiograms selected into one of the two areas for a post-PCI angiogram are assessed as a post-PCI angiogram and the angiogram selected into the area for the diagnostic angiogram is assessed as a diagnostic angiogram. In other instances, angiograms selected into any of the areas may induce a prompt with indicators, similar to post-PCI indicator 508a and diagnostic indicator 508b, for a user to select between to determine how the angiogram will be assessed. Alternatively, such a prompt can be displayed in instances where the areas state "Select a diagnostic angiogram" instead of "Select an angiogram."

Thus, in some embodiments FIG. 5A may be used to select a combination of diagnostic and post-PCI images. For example, two post-PCI images may be automatically selected by the system. In this example, the two post-PCI images may represent images associated with a particular cardiac phase (e.g., end-diastolic images). The two post-PCI images may additionally, in some instances, be selected such that they are offset via a threshold c-arm imaging angle. In this way, they may be used to generate a three-dimensional model of a portion of a cardiovascular system (e.g., via stereo matching techniques or other techniques). The diagnostic image may be selected by the system according to the techniques described above, and may represent a diagnostic image used during a diagnostic assessment. As described herein, a portion of the diagnostic image which depicts a lesion or lesions may be masked during generation of the three-dimensional model. For example, the three-dimensional model may be generated using the post-PCI images and the diagnostic image may be used to enhance accuracy of the model. As an example, the image portions of the diagnostic image, outside of the lesion or lesions, may be used to refine the three-dimensional model.

FIG. 5B is a user interface 510 illustrating an example post-PCI assessment 511. The post-PCI assessment 511 may be based on two post-PCI images and one diagnostic image as illustrated with respect to element 516, with the diagnostic image indicated by a diagnostic indicator 508b. In some instances, the post-PCI assessment 511 can be based on at least one post-PCI image. As illustrated, the post-PCI assessment 511 can include a post-PCI vascular index (e.g., "0.95"). As described above, the index may represent an index a threshold distance further from a PCI-treatment, an average index value across the PCI-treatment, a value selected based on a user interacting with element 514 to indicate a location along a vessel, and so on.

The post-PCI assessment 511 may also include a vascular index graph 512 (e.g., a pullback graph) depicting values of the index indicative of vascular function along the length of the vessel. The post-PCI assessment 511 may also include a vascular index pie chart 513 depicting the overall health of the target vessel by illustrating what volume of the target vessel has an index below a threshold value and a visual indicator on how the index values are distributed on the target vessel. In some instances (not shown), the post-PCI assessment 511 may also include a vessel diameter graph depicting the actual diameter of the vessel along its length, which can be compared to a simulated healthy vessel diameter graph to visualize the PCI treated vessel compared to a healthy vessel.

The post-PCI assessment 511 may also include a 3D model 515 of the cardiac vasculature. Portions of the 3D model 515 may be assigned color based on the values of the index (e.g., FFR values), or index drops reduction in FFR, which are associated with the portions. For example, a portion of the 3D model 515 depicting a lesion may be colored yellow, red, or black. In this example, portions of the 3D model 515 subsequent to the lesion (e.g., downstream) may be similarly colored yellow, red, or black. Portions prior to the lesion may be colored white, orange, and so on. Additionally, the lesion may cause an index drop such that the color yellow, red, or black may be used. These colors may be selected based on an extent of the index drop (e.g., a higher index drop may use black while a lower index drop may use yellow).

The 3D model 515 can include a lesion marker 514 that can be adjusted by the user to move along different portions of the 3D model 515, which can adjust the value of the post-PCI vascular index 140 at the portion of the vessel represented by the 3D model 515 corresponding to the location of the lesion marker 514. In addition, the post-PCI assessment 511 can include a pullback graph tab 519 in the user interface to bring up a pullback graph (e.g., graph 512) with the post-PCI vascular index 140 along the vessel. The post-PCI assessment 511 can include a post-PCI graphic 518 to indicate to the user that information depicted is related to a post-PCI assessment 511, rather than a diagnostic assessment. The post-PCI graphic 518 can include an option to swap the assessment to a diagnostic assessment through the user interface. The diagnostic assessment 210 can include similar information (e.g., graphs, values, models, angiograms, and so on) as the post-PCI assessment 511. As mentioned above, the diagnostic assessment 210 can include a post-PCI transition graphic 211 that a user can select to transition from the diagnostic assessment 210 to start the process for the post-PCI assessment 511.

FIG. 5C is a user interface 520 illustrating a post-PCI comparison 521 between an example diagnostic assessment 210 and post-PCI assessment 511. In some instances, the user interface 520 can be accessed by saving (or printing) the post-PCI assessment 511 and can include options to display either just the post-PCI assessment 511, which may appear similar to user interface 510, or the post-PCI comparison 521. When saving either the post-PCI assessment 511 or post-PCI comparison 521, the user interface 510 or the user interface 520 can be static (e.g., a report, such as an image, .pdf, document, and so on) or dynamic (e.g., an interactive user interface).

The user interface 520 may include information that highlights, or otherwise makes clear, the benefit afforded by a PCI treatment. For example, the diagnostic assessment 210 indicates an FFR value of 0.78 (which is less than the 0.8 threshold), while the post-PCI assessment 511 indicates an FFR value of 0.95. The user interface can include an index for both the diagnostic assessment 210 and the post-PCI assessment 511 corresponding to the same location of the vessel, and correspondingly adjust according to any changes in selected location in either assessment.

The user interface can also display another index value for both the diagnostic assessment 210 and the post-PCI assessment 511, such as a distal FFR value that is the FFR value 20% away from the bottom tip of the vessel to the beginning of the vessel, or an average FFR value across the length of the vessel or impacted region for each of the diagnostic assessment 210 and the post-PCI assessment 511. The impacted region for the diagnostic assessment 210 may be the length of the vessel associated with the lesion and the impacted region for the post-PCI assessment 511 may be the length of the vessel associated with the post-PCI treated area. In some instances, the length of the vessel associated with lesion and post-PCI treated area can be the same. Similarly, 3D models of the vessels may be colored differently to graphically illustrate the benefit (e.g., the diagnostic 3D model on the left includes black indicating severe stenosis).

In a static user interface, the post-PCI comparison 521 can be a snapshot of the post-PCI assessment 511 and diagnostic assessment 210, which may not allow a user to adjust values, such as the location of the index markers 514A-B or the viewing angle of the 3D models 515A-B, in either assessment. The values indicated in a static user interface can reflect the options selected in the post-PCI assessment 511 prior to accessing the post-PCI comparison 521. For example, values such as viewing angle and the location of the index marker 514b and/or its related values (e.g., post-PCI vascular index 140b) displayed on the post-PCI comparison 521 for the post-PCI assessment 511 can match what the user had selected prior to saving the post-PCI assessment 511. In such examples, location of the index marker 514A for the diagnostic assessment 210 displayed in the post-PCI comparison 521 can be synced to index marker 514B to be at the same location along their respective 3D models 515A-B, to provide the related values (e.g., diagnostic vascular index 140a and post-PCI vascular index 140b) at the same vessel location for comparison. Similarly, the viewing angle of the diagnostic 3D model 515A can be synced with the viewing angle of post-PCI 3D model 515B (e.g., the models 515A-515B may be adjustable, such as rotatable or the user may zoom in and zoom out of the models). In alternative examples, the values indicated on the diagnostic assessment 210 of the post-PCI comparison 521 can be based on the selections made by the user the last the diagnostic assessment 210 was individually accessed, which may be immediately prior to operating the post-PCI assessment system 100, or at a default location.

In a dynamic user interface for the post-PCI comparison 521, one or either of the post-PCI assessment 511 and diagnostic assessment 210 can allow for user interaction to adjust values or user interface elements. In some instances, the user selections in one of the assessments can be synced to cause a similar adjustment of the values in the other assessment. For example, adjusting the index marker 514b to a different position along the post-PCI 3D model 515B can automatically cause the index marker 514a to move to the corresponding position along the diagnostic 3D model 515A. In this example, corresponding index values (e.g., FFR values) may be simultaneously updated. By further example, the post-PCI comparison can include a pullback graph for the diagnostic assessment 210 and a pullback graph for the post-PCI assessment 511, and adjustments of values in one of the pullback graphs can cause a corresponding change to the values in the other pullback graph. Similarly, adjusting the viewing angle in one assessment can cause corresponding adjustments to the viewing angle in the other assessment, or opening a different value (such as between the vessel diameter graph and pullback graph tab 519 or opening the associated angiograms) to be displayed in one assessment can cause opening the corresponding value to be displayed in the other assessment. In some instances, diagnostic assessment 210 and post-PCI assessment 511 may not be synced.

Graphs 522 and 523 can be additionally included, with graph 522 for the diagnostic assessment 210 indicating a severe index drop. Various optional graphs, values, and images can be displayed alongside both or either the diagnostic assessment 210 and post-PCI assessment 511, with options to select what is displayed on the post-PCI comparison 521. For example, the post-PCI comparison 521 can include the post-PCI assessment 511 and only the diagnostic 3D model 515a from the diagnostic assessment 210. In another example, the post-PCI comparison 521 can include only the post-PCI 3D model 515b from the post-PCI assessment 511 and the diagnostic 3D model 515a from the diagnostic assessment 210. In some instances, the post-PCI comparison 521 can display the user interface 520 on the same application as the post-PCI assessment system 100, or other similar systems, without saving (or printing). In such instances, the post-PCI comparison 521 can also be static or dynamic.

Other Instances

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the instance, certain acts, events, or functions of any of the algorithms described herein can be performed in a different sequence or can be added, merged, or left out altogether (for example, not all described acts or events are necessary for the practice of the algorithms). Moreover, in certain instances, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the instances disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another instance, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain instances include, while other instances do not include, certain features, elements and/or steps. Thus, such conditional language is not generally intended to imply that features, elements and/or steps are in any way required for one or more instances or that one or more instances necessarily include logic for deciding, with or without user input or prompting, whether these features, elements and/or steps are included or are to be performed in any particular instance.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain instances require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the instances described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the term "about" refers to within ±10%.

The terms "comprises", "comprising", "includes", "including", "having", "such as" and their conjugates mean: "including but not limited to".

The words "example" and "exemplary" are used herein to mean "serving as an example, instance or illustration". Any instance described as an "example or "exemplary" is not necessarily to be construed as preferred or advantageous over other instances and/or to exclude the incorporation of features from other instances.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical, and medical arts.

Throughout this application, various instances of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It should be emphasized that many variations and modifications may be made to the above-described instances, the elements of which are to be understood as being among other acceptable examples. All such modifications and variations are intended to be included herein within the scope of this disclosure.

What is claimed is:

1. A method implemented by a system of one or more processors, the method comprising:
    accessing a plurality of two-dimensional (2-D) angiographic images depicting at least one vessel of a patient's heart, the plurality of 2-D angiographic images including: at least one post-percutaneous coronary intervention (post-PCI) image and one or more diagnostic images, wherein the post-PCI images depict a PCI-treated location is included to revascularize a lesion, and wherein the diagnostic images depict the lesion;
    receiving information specifying positions of the PCI-treated location in the post-PCI images;
    masking individual portions of the diagnostic images during generation of a three-dimensional (3-D) model of the at least one vessel of the patient's heart, wherein the 3-D model is generated based on the at least one post-PCI image and the one or more diagnostic images while ignoring the individual portions of the one or more diagnostic images that are masked, wherein the at least one post-PCI image and the one or more diagnostic images used to generate the 3-D model depict the at least one vessel of the patient's heart from different viewpoints from each other;
    determining an index indicative of vascular function derived based on the three-dimensional model; and
    presenting, via a user interface, summary information associated with PCI, the summary information including at least the determined index.

2. The method of claim 1, wherein receiving the information specifying the positions of the PCI-treated location comprises presenting the post-PCI images via the user interface and receiving the information via user input.

3. The method of claim 1, wherein receiving the information specifying the positions of the PCI location in the post-PCI images comprises the system determining the positions of the PCI-treated location based on analyzing the post-PCI images.

4. The method of claim 1, wherein the three-dimensional model is generated based on matching features included in the 2-D angiographic images, and wherein the portions of the diagnostic images depicting the lesion are not used to generate the three-dimensional model.

5. The method of claim 1, wherein the positions of the PCI location are matched to corresponding positions of the diagnostic images, and wherein the corresponding positions are masked.

6. The method of claim 1, wherein the index is a fractional flow reserve value.

7. The method of claim 1, wherein the index is compared to a different index determined based on a set of diagnostic images depicting the at least one vessel of the patient's heart, and wherein the comparison is included in the summary information.

8. The method of claim 7, wherein the user interface includes:
a first portion associated with the different index, the first portion including:
the different index, and
a graphical representation of the at least one vessel, wherein colors are assigned to portions of the at least one vessel based on respective index drops associated with the different index, and
a second portion associated with the index, the second portion including:
the index, and
a graphical representation of the at least one vessel, wherein colors are assigned to portions of the at least one vessel based on respective index drops associated with the index.

9. The method of claim 7, wherein the set of diagnostic images comprises at least one of the one or more diagnostic images and at least one other diagnostic images.

10. The method of claim 9, wherein the summary information comprises a marked post-PCI index associated with a user-selected portion of the 3-D model and a marked diagnostic index associated with a corresponding portion of a diagnostic 3-D model based on the set of diagnostic images.

11. The method of claim 9, wherein the summary information comprises the 3-D model and a diagnostic 3-D model based on the set of diagnostic images, the 3-D model and the diagnostic 3-D model presented at a same viewing angle.

12. The method of claim 9, further comprising:
adjusting at least one value in the summary information associated with the PCI via the user interface,
presenting the adjusted at least one value via the user interface, and
in response to adjusting the at least one value, present an adjustment to a corresponding value in the summary information associated with the set of diagnostic images for comparison.

13. The method of claim 1, further comprising presenting, via the user interface, the plurality of 2-D angiographic images, the positions of the PCI-treated location in the post-PCI images and the individual portions of the diagnostic images depicting the lesion that are masked.

14. The method of claim 1, wherein the one or more diagnostic images is automatically selected from a plurality of diagnostic images based on a score determined by comparing each diagnostic image of the plurality of diagnostic images with the at least one post-PCI images.

15. The method of claim 14, wherein the plurality of diagnostic images comprises a set of diagnostic images used to determine a diagnostic index indicative of vascular function, the set of diagnostic images depicting the at least one vessel of the patient's heart captured at a time prior than when the at least one post-PCI images were captured.

16. The method of claim 1, further comprising presenting, via the user interface, a set of 2-D angiographic images, wherein the plurality of 2-D angiographic images are accessed from the set of 2-D angiographic images.

17. The method of claim 16, further comprising filtering the set of 2-D angiographic images into subsets based on at least one of a quality score for each 2-D angiographic image or a time stamp for each of the 2-D angiographic images.

18. The method of claim 17, wherein 2-D angiographic images in the subsets cannot be accessed for the plurality of 2-D angiographic images.

19. The method of claim 1, wherein two post-PCI images and one diagnostic image form the plurality of 2-D angiographic images.

20. The method of claim 19, wherein the one diagnostic image is selected from a threshold number of diagnostic images used to determine a diagnostic assessment associated with the lesion.

21. The method of claim 1, wherein the plurality of 2-D angiographic images comprises two post-PCI images and one diagnostic image.

22. The method of claim 1, wherein the index is derived from an analysis of the three-dimensional model.

23. The method of claim 1, wherein the plurality of 2-D angiographic images comprises at least two post-PCI images and at least one diagnostic image.

24. The method of claim 1, wherein the individual portions of the one or more diagnostic images that are masked depict the lesion.

25. A system comprising one or more processors and non-transitory computer storage media storing instructions that when executed by the one or more processors, cause the one or more processors to:
access a plurality of two-dimensional (2-D) angiographic images depicting at least one vessel of a patient's heart, the plurality of 2-D angiographic images including: at least one post-percutaneous coronary intervention (post-PCI) images and one or more diagnostic images, wherein the post-PCI images depict a PCI-treated location is included to revascularize a lesion, and wherein the diagnostic images depict the lesion;
receive information specifying positions of the PCI-treated location in the post-PCI images;
mask individual portions of the diagnostic images during generation of a three-dimensional (3-D) model of the at least one vessel of the patient's heart, wherein the 3-D model is generated based on the at least one post-PCI image and the one or more diagnostic images while ignoring the individual portions of the one or more diagnostic images that are masked, wherein the at least one post-PCI image and the one or more diagnostic images used to generate the 3-D model depict the at least one vessel of the patient's heart from different viewpoints from each other;
determine an index indicative of vascular function derived based on the three-dimensional model; and
present, via a user interface, summary information associated with PCI, the summary information including at least the determined index.

26. A non-transitory computer storage media storing instructions that when executed by a system of one or more processors, cause the system to:
access a plurality of two-dimensional (2-D) angiographic images depicting at least one vessel of a patient's heart, the plurality of 2-D angiographic images including at least one post-percutaneous coronary intervention (post-PCI) images and further including one or more diagnostic images, wherein the post-PCI images depict a PCI-treated location is included to revascularize a lesion, and wherein the diagnostic images depict the lesion;
receive information specifying positions of the PCI-treated location in the post-PCI images;
mask individual portions of the diagnostic images during generation of a three-dimensional (3-D) model of the at least one vessel of the patient's heart, wherein the 3-D model is generated based on the at least one post-PCI image and the one or more diagnostic images while ignoring the individual portions of the one or more diagnostic images that are masked, wherein the at least one post-PCI image and the one or more diagnostic images used to generate the 3-D model depict the at least one vessel of the patient's heart from different viewpoints from each other;

determine an index indicative of vascular function derived based on the three-dimensional model; and present, via a user interface, summary information associated with PCI, the summary information including at least the determined index.

\* \* \* \* \*